United States Patent
Lockwood et al.

(10) Patent No.: US 7,093,023 B2
(45) Date of Patent: Aug. 15, 2006

(54) METHODS, SYSTEMS, AND DEVICES USING REPROGRAMMABLE HARDWARE FOR HIGH-SPEED PROCESSING OF STREAMING DATA TO FIND A REDEFINABLE PATTERN AND RESPOND THERETO

(75) Inventors: John Lockwood, St. Louis, MO (US); Ronald Loui, St. Louis, MO (US); James Moscola, St. Louis, MO (US); Michael L Pachos, Boston, MA (US)

(73) Assignee: Washington University, St. Louis, MO (US)

( * ) Notice: Subject to any disclaimer, the term of this patent is extended or adjusted under 35 U.S.C. 154(b) by 66 days.

(21) Appl. No.: 10/152,532

(22) Filed: May 21, 2002

(65) Prior Publication Data

US 2003/0221013 A1    Nov. 27, 2003

(51) Int. Cl.
    *G06F 15/16*    (2006.01)
(52) U.S. Cl. ..................... 709/231; 709/246
(58) Field of Classification Search ............... 709/246, 709/231, 208, 221; 704/2, 9; 341/51, 52, 341/174
    See application file for complete search history.

(56) References Cited

U.S. PATENT DOCUMENTS

| | | | |
|---|---|---|---|
| 3,601,808 A | 8/1971 | Vlack | |
| 3,611,314 A | 10/1971 | Pritchard et al. | |
| 3,729,712 A | 4/1973 | Glassman | |
| 3,824,375 A | 7/1974 | Gross et al. | |
| 3,848,235 A | 11/1974 | Lewis et al. | |
| 3,906,455 A | 9/1975 | Houston et al. | |
| 4,298,898 A | 11/1981 | Cardot | |
| 4,385,393 A | 5/1983 | Chaure et al. | |
| 4,464,718 A | 8/1984 | Dixon et al. | |
| 4,550,436 A | 10/1985 | Freeman et al. | |
| 4,823,306 A | 4/1989 | Barbic et al. | |
| 4,941,178 A | 7/1990 | Chuang | |
| 5,023,910 A | 6/1991 | Thomson | |
| 5,050,075 A | 9/1991 | Herman et al. | |
| 5,101,424 A | 3/1992 | Clayton et al. | |
| 5,140,692 A | 8/1992 | Morita | |
| 5,163,131 A | 11/1992 | Row et al. | |
| 5,179,626 A | 1/1993 | Thomson | |

(Continued)

OTHER PUBLICATIONS

Kulig et al., "System and Method for Controlling Transmission of Data Packets Over an Information Network", pending U.S. Appl. No. 10/037,593.

(Continued)

*Primary Examiner*—Marc D. Thompson
(74) *Attorney, Agent, or Firm*—Sonnenschein Nath & Rosenthal LLP

(57) ABSTRACT

A reprogrammable packet processing system for processing a stream of data is disclosed herein. A reprogrammable data processor is implemented with a programmable logic device (PLD), such as a field programmable gate array (FPGA), that is programmed to determine whether a stream of data applied thereto includes a string that matches a redefinable data pattern. If a matching string is found, the data processor performs a specified action in response thereto. The data processor is reprogrammable to search packets for the presence of different data patterns and/or perform different actions when a matching string is detected. A reconfiguration device receives input from a user specifying the data pattern and action, processes the input to generate the configuration information necessary to reprogram the PLD, and transmits the configuration information to the packet processor for reprogramming thereof.

30 Claims, 11 Drawing Sheets

U.S. PATENT DOCUMENTS

| | | | |
|---|---|---|---|
| 5,226,165 A | | 7/1993 | Martin |
| 5,243,655 A | | 9/1993 | Wang |
| 5,319,776 A | | 6/1994 | Hile et al. |
| 5,327,521 A | | 7/1994 | Savic et al. |
| 5,388,259 A | | 2/1995 | Fleischman et al. |
| 5,396,253 A | | 3/1995 | Chia |
| 5,418,951 A | | 5/1995 | Damashek |
| 5,432,822 A | | 7/1995 | Kaewell, Jr. |
| 5,465,353 A | | 11/1995 | Hull et al. |
| 5,481,735 A | * | 1/1996 | Mortensen et al. ......... 709/246 |
| 5,488,725 A | | 1/1996 | Turtle et al. |
| 5,497,488 A | | 3/1996 | Akizawa et al. |
| 5,544,352 A | | 8/1996 | Egger |
| 5,546,578 A | | 8/1996 | Takada |
| 5,651,125 A | | 7/1997 | Witt et al. |
| 5,721,898 A | | 2/1998 | Beardsley et al. |
| 5,774,835 A | | 6/1998 | Ozawa |
| 5,774,839 A | | 6/1998 | Shlomot |
| 5,781,772 A | | 7/1998 | Wilkinson, III et al. |
| 5,805,832 A | * | 9/1998 | Brown et al. ................... 704/9 |
| 5,864,738 A | | 1/1999 | Kessler et al. |
| 5,913,211 A | | 6/1999 | Nitta |
| 5,930,753 A | | 7/1999 | Potamianos et al. |
| 5,943,429 A | | 8/1999 | Händel |
| 6,023,760 A | * | 2/2000 | Karttunen ...................... 704/9 |
| 6,044,407 A | * | 3/2000 | Jones et al. ................. 709/246 |
| 6,317,795 B1 | * | 11/2001 | Malkin et al. .............. 709/246 |
| 6,430,272 B1 | * | 8/2002 | Maruyama et al. ...... 379/88.22 |
| 6,711,558 B1 | | 3/2004 | Indeck et al. |

OTHER PUBLICATIONS

Lockwood et al., FPGrep and FPSed: Regular Expression Search and Substitution for Packet Streaming in Field Programmable Hardware, unpublished, Jan. 2002.

Berk, Elliott, "JLex: A lexical analyzer generator for Java™ ", downloaded from http://www.cs.princeton.edu/~appel/modern/java/Jlex/ in Jan. 2002.

Braun et al., "Layered Protocol Wrappers for Internet Packet Processing in Reconfigurable Hardware", *Proceedings of Hot Interconnects 9 (Hotl-9)* Stanford, CA, Aug. 22-24, 2001, pp. 93-98.

Lockwood, J., "Evolvable Internet Hardware Platforms", *NASA/DoD Workshop on Evolvable Hardware (EHW'01)*, Long Beach, CA, Jul. 12-14, 2001, pp. 271-279.

Lockwood, J., "Platform and Methodology for Teaching Design of Hardware Modules in Internet Routers and Firewalls", *IEEE Computer Society International Conference on Microelectronic Systems Education (MSE'2001)*, Las Vega, NV, Jun. 17-18, 2001, pp. 56-57.

Shah, N., "Understanding Network Processors", Version 1.0, University of California-Berkeley, Sep. 4, 2001.

Keutzer et al., "A Survey of Programmable Platforms—Network Proc", University of California-Berkeley, undated.

Lockwood et al., Reprogrammable Network Packet Processing on the Field Programmable Port Extender (FPX), *ACM International Symposium on Field Programmable Gat Arrays (FPGA'2001)*, Monterey, Ca, Feb. 2001, pp. 87-93.

Lockwood, J., "An Open Platform for Development of Network Processing Modules in Reprogrammable Hardware", *IEC DesignCon 2001*, Santa Clara, CA, Jan. 2001, Paper WB-19.

Lockwood et al., Field Programmable Port Extender (FPX) for Distributed Routing and Queuing, *ACM International Symposium on Field Programmable Gate Arrays (FPGA'2000)*, Monterey, CA, Feb. 2000, pp. 137-144.

Choi et al., "Design of a Flexible Open Platform for High Performance Active Networks", Allerton Conference, Campaign, II, 1999.

Fu et al., The FPX KCPSM Module: An Embedded, Reconfigurable Active Processing Module for the Field Programmable Port Extender (FPX), *Washington University, Department of Computer Science, Technical Report WUCS-01-14*, Jul. 2001.

Lockwood et al., Hello, World: A Simple Application for the Field Programmable Port Extender (FPX), *Washington University, Department of Computer Science, Technical Report WUCS-00-12*, Jul. 11, 2000.

Taylor et al., "Generalized RAD Module Interface Specification of the Field Programmable Port Extender (FPX) Version 2", *Washington University, Department of Computer Science, Technical Report*, Jan. 8, 2000.

Lockwood et al., "Parallel FPGA Programming over Backplane Chassis", *Washington University, Department of Computer Science, Technical Report WUCS-00-11*, Jun. 12, 2000.

"The Field-Programmable Port Extender (FPX)", downloaded from http://www.arl.wustl.edu/arl/ in Mar. 2002.

"Overview", Field Programmable Port Extender: Jan. 2002 Gigabit Workshop Tutorial, *Washington University*, St. Louis, MO, Jan. 3-4, 2002.

Lockwood, J., "Introduction", Field Programmable Port Extender: Jan. 2002 Gigabit Workshop Tutorial, *Washington University*, St. Louis, MO, Jan. 3-4, 2002.

Lockwood, J., "Building Networks with Reprogrammable Hardware", Field Programmable Port Extender: Jan. 2002 Gigabit Workshop Tutorial, *Washington University*, St. Louis, MO, Jan. 3-4, 2002.

Taylor et al., "Modular Design Techniques for the FPX", Field Programmable Port Extender: Jan. 2002 Gigabit Workshop Tutorial, *Washington University*, St. Louis, MO, Jan. 3-4, 2002.

Lockwood, J., "Protocol Processing on the FPX", Field Programmable Port Extender: Jan. 2002 Gigabit Workshop Tutorial, *Washington University*, St. Louis, MO, Jan. 3-4, 2002.

Lockwood, J., "Stimulation and Synthesis", Field Programmable Port Extender: Jan. 2002 Gigabit Workshop Tutorial, *Washington University*, St. Louis, MO, Jan. 3-4, 2002.

Lockwood, J., "Hardware Laboratory Configuration", Field Programmable Port Extender: Jan. 2002 Gigabit Workshop Tutorial, *Washington University*, St. Louis, MO, Jan. 3-4, 2002.

Lockwood, J., "Simulation of the Hello World Application for the Field-Programmable Port Extender (FPX)", *Washington University, Applied Research Lab*, Spring 2001 Gigabits Kits Workshop.

"Lucent Technologies Delivers "Payload Plus" Network Processors for Programmable, Multi-Protocol, OC-48c Processing", *Lucent Technologies Press Release*, downloaded from http://www.lucent.com/press/1000/0010320.meb.html on Mar. 21, 2002.

Payload Plus™ Agere System Interface, Agere Systems Product Brief, Jun. 2001, downloaded from Internet, Jan. 2002.

Sidhu et al., "Fast Regular Expression Matching using FPGAs", IEEE Symposium on Field Programmable Custom Computing Machines (FCCM 2001), Apr. 2001.

Sidhu et al., "String Matching on Multicontext FPGAs using Self-Reconfiguration", FPGA '99: Proceedings of the 1999 ACM/SIGDA 7th International Symposium on Field Programmable Gate Arrays, Feb. 1999, pp. 217-226.

Franklin et al., "Assisting Network Intrusion Detection with Reconfigurable Hardware", Symposium on Field-Programmable Custom Computing Machines (FCCM 2002), Apr. 2002, Napa, California.

Patent Cooperation Treaty; International Search Report; Jul. 10, 2003, PCT/US/01/11255.

Hollaar, Lee A.; *Hardware Systems for Text Information Retrieval*; Proceedings of the Sixth Annual International ACM Sigir Conference on Research and Development in Information Retrieval; Jun. 6-8, 1983; pp. 3-9; Baltimore, Maryland, USA.

Pramanik et al.; *A Hardware Pattern Matching Algorithm on a Dataflow*; Computer Journal; Jul. 1, 1985; pp. 264-269; vol. 28, No. 3; Oxford University Press, Surrey, Great Britain.

* cited by examiner

Data Pattern: U.*S.*A
Replacement String: United States

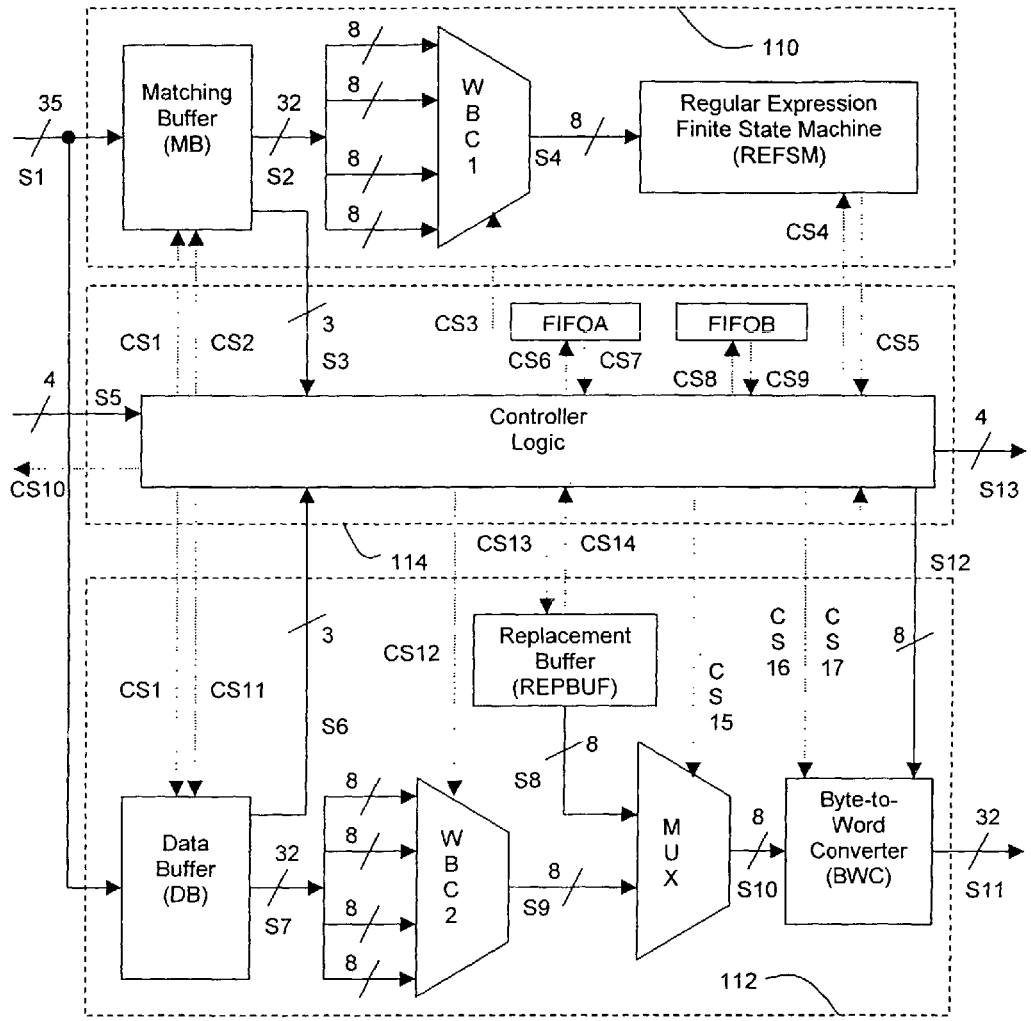

Signal Table

| | | | |
|---|---|---|---|
| S1: | 32 Bit Word Input+SOF, SOD, EOF | CS1: DATA_WR_ADD | CS10: CONGESTION |
| S2: | 32 Bit Word from MB to WBC1 | CS2: MB_RD_ADD | CS11: DB_RD_ADD |
| S3: | Matching Path Control Bits | CS3: WBC1_SELECT | CS12: WBC2_SELECT |
| S4: | Byte from WBC1 to REFSM REPBUF_ENABLE | CS4: REFSM_ENABLE | CS13: |
| S5: | 4 Bit Control Information Input | CS5: REFSM_STATUS | CS14: REPBUF_DONE |
| S6: | Data Path Control Bits | CS6: WR_START_ADD | CS15: MUX_SELECTOR |
| S7: | 32 Bit Word from DB to WBC2 | CS7: RD_START_ADD | CS16: BWC_ENABLE |
| S8: | Byte of Replacement String PADDING_COUNT | CS8: WR_END_ADD | CS17: |
| S9: | Byte from WBC2 | CS9: RD_END_ADD | |
| S10: | Byte from MUX output | | |
| S11: | 32 Bit Word Output | | |
| S12: | Padding Byte | | |
| S13: | 4 Bit Control Information Output | | |

Figure 5

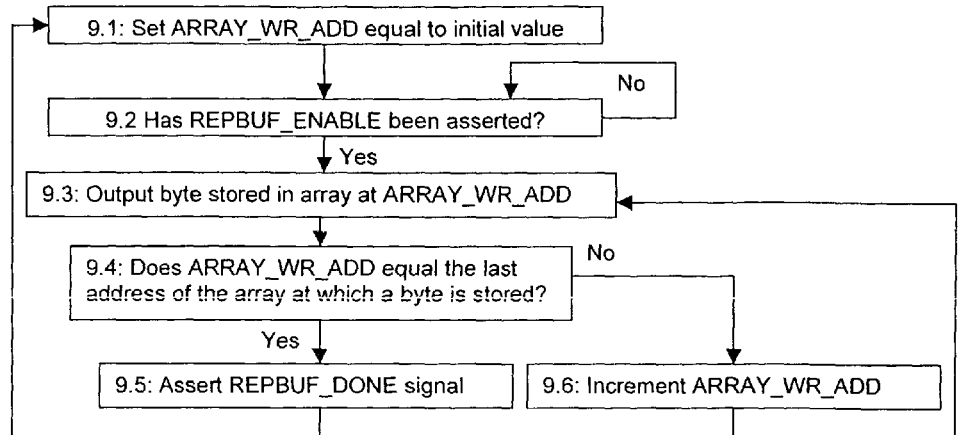
Figure 9
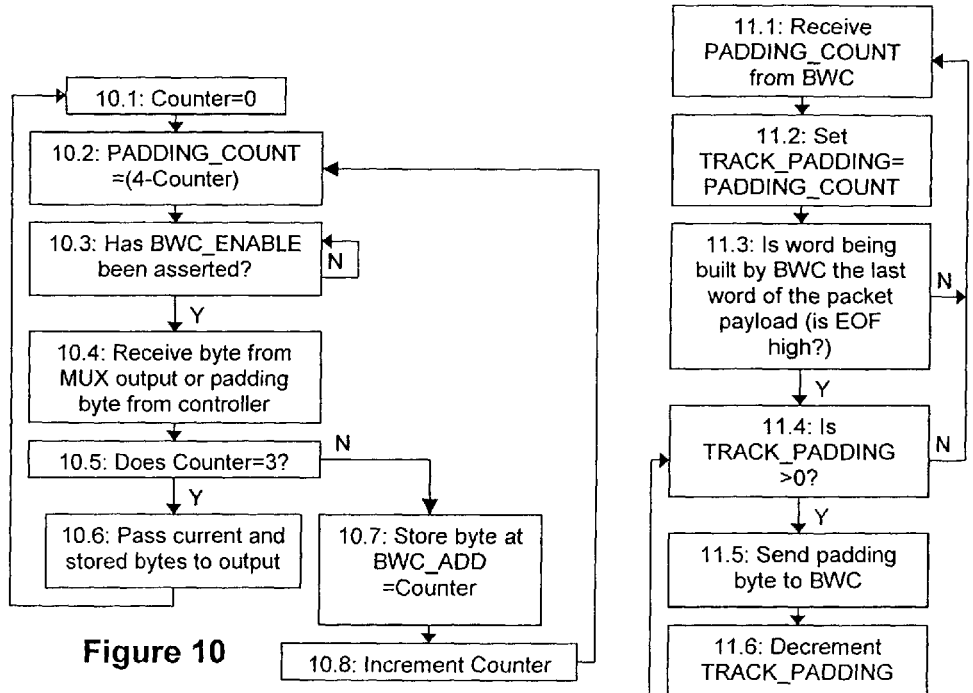
Figure 10
Figure 11

METHODS, SYSTEMS, AND DEVICES USING REPROGRAMMABLE HARDWARE FOR HIGH-SPEED PROCESSING OF STREAMING DATA TO FIND A REDEFINABLE PATTERN AND RESPOND THERETO

FIELD OF THE INVENTION

The present invention relates to high-speed processing of data, such as packets transmitted over computer networks. More specifically, the present invention relates to the processing of packet payloads to (1) detect whether a string is present in those payloads that matches a redefinable data pattern, and (2) perform a redefinable action upon detection thereof.

BACKGROUND OF THE INVENTION

It is highly desirable to possess the ability to monitor the content of packets transmitted over computer networks. Whether the motivation is to identify the transmission of data files containing material such as copyrighted audio, film/video, software, published articles and book content, to secure confidential data within a company's internal computer system, to detect and eliminate computer viruses, to identify and locate packet transmissions that may be part of a criminal conspiracy (such as e-mail traffic between two persons planning a crime), or to monitor data transmissions of targeted entities, the ability to search packet payloads for strings that match a specified data pattern is a powerful tool in today's electronic information age. Further, the ability to modify the data stream permits the system to, among other things, filter data, reformat data, translate between languages, extract information, insert data, or to notify others regarding the content.

String matching and pattern matching have been the subject of extensive studies. In the past, software-based string matching techniques have been employed to determine whether a packet payload includes a data pattern. However, such software-based techniques are impractical for widespread use in computer networks because of the inherently slow packet processing speeds that result from software execution.

For example, U.S. Pat. No. 5,319,776 issued to Hile et al. (the disclosure of which is hereby incorporated by reference) discloses a system wherein data in transit between a source medium and a destination medium is tested using a finite state machine capable of determining whether the data includes any strings that represent the signatures of known computer viruses. However, because the finite state machine of Hile is implemented in software, the Hile system is slow. As such, the Hile system is impractical for use as a network device capable of handling high-speed line rates such as OC-48 where the data rate approaches 2.5 gigabits per second. Furthermore, software-based techniques are traditionally and inherently orders of magnitude slower than a hardware-based technique.

Another software-based string matching technique is found in U.S. Pat. No. 5,101,424 issued to Clayton et al. (the disclosure of which is hereby incorporated by reference). Clayton discloses a software-based AWK processor for monitoring text streams from a telephone switch. In Clayton, a data stream passing through a telephone switch is loaded into a text file. The Clayton system then (1) processes the content of the text file to determine if particular strings are found therein, and (2) takes a specified action upon finding a match. As with the Hile system described above, this software-based technique is too slow to be practical for use as a high-speed network device.

Furthermore, a software tool known in the art called SNORT was developed to scan Internet packets for combinations of headers and payloads that indicate whether a computer on a network has been compromised. This software program is an Open Source Network Intrusion Detection System that scans packets that arrive on a network interface. Usually, the packets arrive on a media like Ethernet. The program compares each packet with the data specified in a list of rules. If the fields in the header or parts of the payload match a rule, the program performs responsive tasks such as printing a message on a console, sending a notification message, or logging an event to a database. As with the above-described systems, SNORT, by virtue of being implemented in software, suffers from slow processing speed with respect to both its matching tasks and its responsive tasks.

In an effort to improve the speed at which packet payloads are processed, systems have been designed with dedicated application specific integrated circuits (ASICs) that scan packet payloads for a particular string. While the implementation of payload scanning on an ASIC represented a great speed improvement over software-based techniques, such ASIC-based systems suffered from a tremendous flexibility problem. That is, ASIC-based payload processing devices are not able to change the method of searching for the string against which packets are compared because a change in the search string necessitates the design of a new ASIC tailored for the new search string (and the replacement of the previous ASIC with the new ASIC). That is, the chip performing the string matching would have to be replaced every time the search string is changed. Such redesign and replacement efforts are tremendously time-consuming and costly, especially when such ASIC-based systems are in widespread use.

To avoid the slow processing speed of software-based pattern matching and the inflexibility of ASIC-based pattern matching, reprogrammable hardware, such as field programmable gate arrays (FPGAs), have been employed to carry out pattern matching. Such an FPGA-based technique is disclosed in Sidhu, R. and Prasanna, V., "Fast Regular Expression Matching using FPGAs", IEEE Symposium on Field-Programmable Custom Computing Machines (FCCM 2001), April 2001 and Sidhu, R. et al., "String Matching on Multicontext FPGAs Using Self-Reconfiguration", FPGA '99: Proceedings of the 1999 ACM/SIGDA Seventh International Symposium on Field Programmable Gate Arrays, pp. 217–226, February 1999, the entire disclosures of which are hereby incorporated by reference.

The Sidhu papers disclose a technique for processing a user-specified data pattern to generate a non-deterministic finite automata (NFA) operable upon being programmed into a FPGA to determine whether data applied thereto includes a string that matches a data pattern. However, Sidhu fails to address how such a device can also be programmed to carry out a specified action, such as data modification, in the event a matching string is found in the data. Thus, while the Sidhu technique, in using an FPGA to perform pattern matching for a redefinable data pattern, provides high speed through hardware implementation and flexibility in redefining a data pattern through the reprogrammable aspects of the FPGA, the Sidhu technique fails to satisfy a need in the art for a device which not only detects a matching string, but also carries out a specified action upon the detection of a matching string.

Moreover, while the Sidhu technique is capable of scanning a data stream for the presence of any of a plurality of data patterns (where a match is found if $P_1$ or $P_2$ or ... or $P_n$ is found in the data stream—wherein $P_i$ is the data pattern), the Sidhu technique is not capable of either identifying which data pattern(s) matched a string in the data stream or which string(s) in the data stream matched any of the data patterns.

Unsatisfied with the capabilities of the existing FPGA-based pattern matching techniques, the inventors herein have sought to design a packet processing system able to not only determine whether a packet's payload includes a string that matches a data pattern in a manner that is both high-speed and flexible, but also perform specified actions when a matching string is found in a packet's payload.

An early attempt by one of the inventors herein at designing such a system is referred to herein as the "Hello World Application". See Lockwood, John and Lim, David, *Hello, World: A Simple Application for the Field Programmable Port Extender (FPX)*, Washington University Tech Report WUCS-00-12, Jul. 11, 2000 (the disclosure of which is hereby incorporated by reference). In the Hello World Application, a platform using reprogrammable hardware for carrying out packet processing, known as the Washington University Field-Programmable Port Extender (FPX) (see FIG. 10), was programmed with a state machine and a word counter designed to (1) identify when a string comprised of the word "HELL" followed by the word "O***" (wherein each * represents white space) was present in the first two words of a packet payload, and (2) when that string is found as the first two words of a packet payload, replace the word "O***" with the word "O*WO" and append the words "RLD." and "****" as the next two words of the packet payload. The reprogrammable hardware used by the FPX was a field programmable gate array (FPGA). The Hello World Application thus operated to modify a packet with "HELLO" in the payload by replacing "HELLO" with "HELLO WORLD".

While the successful operation of the Hello World Application illustrated to the inventors herein that the implementation of a circuit in reprogrammable hardware capable of carrying out exact matching and string replacement was feasible, the Hello World Application was not accompanied by any device capable of taking full advantage of the application's reprogrammable aspects. That is, while the FPGA programmed to carry out the Hello World Application was potentially reprogrammable, no technique had been developed which would allow the FPGA to be reprogrammed in an automated and efficient manner to scan packets for a search string other than "HELLO", or to replace the matching string with a replacement string other than "HELLO WORLD". The present invention addresses a streamlined process for reprogramming a packet processor to scan packets for different redefinable strings and carry out different redefinable actions upon packets that include a matching string. Toward this end, the present invention utilizes regular expressions and awk capabilities to create a reprogrammable hardware-based packet processor having expanded pattern matching abilities and the ability to take a specified action upon detection of a matching string.

Regular expressions are well-known tools for defining conditional strings. A regular expression may match several different strings. By incorporating various regular expression operators in a pattern definition, such a pattern definition may encompass a plurality of different strings. For example, the regular expression operator ".*" means "any number of any characters". Thus, the regular expression "c.*t" defines a data pattern that encompasses strings such as "cat", "coat", "chevrolet", and "cold is the opposite of hot". Another example of a regular expression operator is "*" which means "zero or more of the preceding expression". Thus, the regular expression "a*b" defines a data pattern that encompasses strings such as "ab", "aab", and "aaab", but not "acb" or "aacb". Further, the regular expression "(ab)*c" encompasses strings such as "abc", "ababc", "abababc", but not "abac" or "abdc". Further still, regular expression operators can be combined for additional flexibility in defining patterns. For example, the regular expression "(ab)*c.*z" would encompass strings such as the alphabet "abcdefghijklmnopqrstuvwxyz", "ababcz", "ababcqsrz", and "abcz", but not "abacz", "ababc" or "ababacxvhgfjz".

As regular expressions are well-known in the art, it is unnecessary to list all possible regular expression operators (for example, there is also an OR operator "|" which for "(a|b)" means any string having "a" or "b") and combinations of regular expression operators. What is to be understood from the background material described above is that regular expressions provide a powerful tool for defining a data pattern that encompasses strings of interest to a user of the invention.

Further, awk is a well-known pattern matching program. Awk is widely used to search data for a particular occurrence of a pattern and then perform a specified operation on the data. Regular expressions can be used to define the pattern against which the data is compared. Upon locating a string encompassed by the pattern defined by the regular expression, awk allows for a variety of specified operations to be performed on the data. Examples of specified operations include simple substitution (replacement), back substitution, guarded substitution, and record separation. These examples are illustrative only and do not encompass the full range of operations available in awk for processing data.

As a further improvement to the Hello World Application, the present invention provides users with the ability to flexibly define a search pattern that encompasses a plurality of different search strings and perform a variety of awk-like modification operations on packets. These features are incorporated into the reprogrammable hardware of the present invention to produce a packet processor having a combination of flexibility and speed that was previously unknown.

SUMMARY OF THE INVENTION

Accordingly, disclosed herein is a reprogrammable data processing system for a stream of data.

One component of the system comprises a reprogrammable data processor for receiving a stream of data and processing that data stream through a programmable logic device (PLD) programmed with a data processing module that is operable to (1) determine whether a string that matches a redefinable data pattern is present in the data stream, and (2) perform a redefinable action in the event such a matching string is found. The data pattern may be defined by a regular expression, and as such, may encompass a plurality of different strings. Additionally, the data stream processed by the data processor may be a stream of data packets transmitted over a computer network, in which case the data processor is a packet processor and the data processing module is a packet processing module. Also, such a packet processing module may be operable to determine whether the payloads of received packets include a string that matches the data pattern. The PLD is preferably a field programmable gate array (FPGA).

Examples of redefinable actions that can be performed by the data processor upon detection of a matching string are modification operations (eg, awk tasks such as string replacement, back substitution, etc.), drop operations, notification operations (wherein an interested party is informed that a match has occurred—the notification can encompass varying levels of detail (a copy of the packet that includes the matching string, a notice of the data pattern that matched a string, a notice of the string that matched a data pattern)), and record-keeping/statistical updates (wherein data is gathered as to the content of the data stream).

Another component of the system is a device for generating configuration information operable to program a PLD with a data processing module, the device comprising: (1) an input operable to receive a data pattern and an action command from a user; (2) a compiler operable to generate configuration information at least in part from the received data pattern and action command (the configuration information defining a data processing module operable to determine whether a data stream applied thereto includes a string that matches the received data pattern), wherein the configuration information is operable to program the PLD with the data processing module. A transmitter may be used to communicate the configuration information from the compiler to the PLD to thereby program the data processing module into the PLD.

The compiler preferably includes a lexical analyzer generator which automates the design of the data processing module. The lexical analyzer generator processes the received data pattern to create a logical representation of a pattern matching state machine at least partially therefrom. The pattern matching state machine carries out the task of determining whether a data stream includes a string that matches the received data pattern. The pattern matching state machine at least partially defines the data processing module.

Because its tasks are carried out in hardware, the data processor of the present invention is capable of operating at network line speeds. Further, because of the device that generates the configuration information used to program the data processor, the data processing system of the present invention is easily reprogrammed to search packets for additional or different data patterns by simply providing the additional or different data pattern thereto, and is also easily reprogrammed to carry out additional or different actions in response to detecting a matching string. Once such input is supplied by a user, the compiler generates the necessary configuration information to carry out the reprogramming and the transmitter communicates that information to the data processor, possibly via a computer network. Not only is the data processor reprogrammable to search packets for different data patterns, but it is also reprogrammable by the same techniques to carry out different packet modification operations. Accordingly, the speed and flexibility of the present invention is unrivaled in the prior art.

Because of this speed and flexibility, the potential applications for the present invention are wide-ranging. For example, the present invention can be used for virus detection. The data pattern with which a packet processor of the present invention is keyed may be a data pattern that encompasses a known computer virus. Thus, the present invention may be used to detect (and eliminate through the modification operation) any known computer viruses that are present in a packet transmission.

Also, the present invention can be used to police copyrights. The packet processor can be keyed with a data pattern that will reliably detect when a party's copyrighted material is transmitted over a network. For example, copyrighted songs, motion pictures, and images are often transmitted over the web via audio files, video files, and image files. By properly designing a data pattern that will detect when such works are present in packet traffic, a practitioner of the present invention can utilize the packet processor to detect the transmission of such copyrighted works and take appropriate action upon detection.

Further still, the present invention can be used to protect against the dissemination of trade secrets and confidential documents. A company having trade secrets and/or confidential documents stored on its internal computer system can utilize the present invention to prevent the unauthorized transmission of such information outside the company's internal network. The company's network firewall can use a packet processor that is keyed to detect and drop any unauthorized packets that are found to include a string that matches a data pattern that encompasses that company's trade secrets and/or confidential information. A company has a wide range of options for flagging their confidential/trade secret information, from adding electronic watermarks to such information (wherein the data processor is keyed by the watermark) to designing a separate data pattern for each confidential/trade secret document/file that will reliably detect when that document/file is transmitted.

Further still, the present invention can be utilized by governmental investigatory agencies to monitor data transmissions of targeted entities over a computer network. The packet processor can be keyed with a data pattern that encompasses keywords of interest and variations thereof. For example, certain words related to explosives (i.e., TNT, etc.), crimes (i.e., kill, rob, etc.), and/or wanted individuals (i.e., known terrorists, fugitives, etc.) can be keyed into the packet processor. Once so configured, the packet processor can detect whether those keywords (or variations) are present in a packet stream, and upon detection take appropriate action (e.g., notify an interested governmental agency, or redirect the data for further automated processing).

Yet another example of an application for the present invention is as a language translator. The packet processor's search and replace capabilities can be used to detect when a word in a first language is present in a packet, and upon detection, replace that word with its translation into a second language. For example, the packet processor can be used to replace the word "friend" when detected in a packet with its Spanish translation "amigo". Taking advantage of the fact that the packet processor of the present invention possesses the capability of searching packets for a plurality of different data patterns, the present invention can be used as a large scale translation device wherein the packet processor is keyed with a large language A-to-language B dictionary. Further still, it is possible that a practitioner of the present invention can develop data patterns that not only take into account word-for-word translations, but also will account for grammatical issues (for example, to reconcile the English method of a noun preceded by an adjective with the Spanish method of a noun followed by an adjective).

Further still, the present invention can be used to monitor/filter packet traffic for offensive content. For example, a parent may wish to use the packet processor of the present invention to prevent a child from receiving profane or pornographic material over the Internet. By keying the data processor to search for and delete profanities or potentially pornographic material, a parent can prevent such offensive material from reaching their home computer.

Yet another potential application is as an encryption/decryption device. The packet processor can be designed to replace various words or letters with replacement codes to thereby encrypt packets designed for the network. On the receiving end, a packet processor can be equipped to decrypt the encrypted packets by replacing the replacement codes with the original data.

These are but a few of the potential uses of the present invention. Those of ordinary skill in the art will readily recognize additional uses for the present invention, and as such, the scope of the present invention should not be limited to the above-described applications which are merely illustrative of the wide range of usefulness possessed by the present invention. The full scope of the present invention can be determined upon review of the description below and the attached claims.

BRIEF DESCRIPTION OF THE DRAWINGS

FIG. 5 is a diagram of the search and replace logic operable to determine whether incoming data includes a string that matches a specified data pattern and replace any matching string with a replacement string;

FIG. 9 is a flowchart illustrating the operation of the replacement buffer;

FIG. 10 is a flowchart illustrating the operation of the byte-to-word converter;

FIG. 11 is a flowchart illustrating how the controller accounts for changes in the byte length of modified packets;

DETAILED DESCRIPTION OF THE PREFERRED EMBODIMENT

Figure 1A:
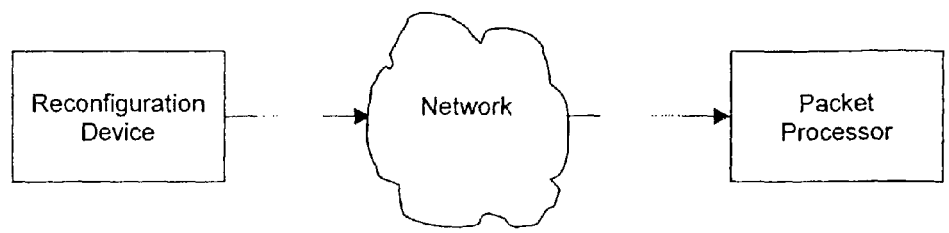
FIG. 1(a) is an overview of the packet processing system of the present invention.
Figure 1B:
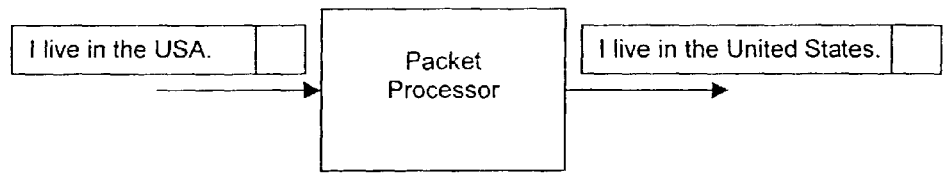
FIG. 1(b) is an illustration of an example of the search and replace capabilities of the packet processor of the present invention.

An overview of the packet processing system of the present invention is shown in FIGS. 1(a) and 1(b). The packet processor operates to receive data packets transmitted over a computer network, and scan those packets to determine whether they include a string that matches a specified data pattern. If the packet is found to include a matching string, the packet processor performs a specified action such as data modification (e.g. string replacement), a packet drop, a notification, or some other action. For example, the packet processor may be configured to determine whether a packet includes the string "recieved", and if that string is found, modify the packet by replacing each instance of "recieved" with the properly-spelled replacement string "received". Or, the packet processor may be configured to determine whether a packet includes a string indicative of a computer virus, and if such a string is found, drop the packet. Also, the packet processor may be configured to send a notification packet or a notification signal to another device if a matching string is found. This list of actions that the packet processor may perform upon detection of a matching string is illustrative only, and the present invention may utilize any of a variety of actions responsive to match detections.

An important feature of the packet processor is that it is reprogrammable to scan packets for different data patterns and/or carry out different specified actions. A programmable logic device (PLD) resident on the packet processor is programmed with a module operable to provide pattern matching functionality and, if a match is found, perform a specified action. By reconfiguring the PLD, the packet processor can be reprogrammed with new modules operable to scan packets for different data patterns and/or carry out different actions when matches are found. Because the packet processor relies on hardware to perform pattern matching, it is capable of scanning received packets at network line speeds. Thus, the packet processor can be used as a network device which processes streaming data traveling at network rates such as OC-48.

To reprogram the packet processor, the reconfiguration device transmits configuration information over the network to the packet processor. The configuration information defines the module that is to be programmed into the PLD. After receiving the configuration information over the network, the packet processor reconfigures the PLD in accordance with the received configuration information.

The reconfiguration device generates the configuration information from user input. Preferably, this input includes the data pattern against which the data packets are to be compared and an action command that specifies the action to be taken upon the detection of a matching string. Once in receipt of this input from the user, the reconfiguration device generates configuration information therefrom that defines a module keyed to the data pattern and action command received from the user.

FIG. 1(b) illustrates how the packet processor operates to perform a simple search and replace task. In the example of FIG. 1(b), the module programmed into the packet processor is tuned with the data pattern "U.*S.*A" which means a U, followed by any number of any characters, followed by an S, followed by any number of any characters, followed by an A. When a string matching that pattern is found in a packet, the module is also keyed to replace the matching string with the replacement string "United States". Thus, when a packet having a payload portion that includes the string "I live in the USA" is received and processed by the packet processor, that packet will be modified so that the payload portion of the outputted packet includes the string "I live in the United States" (the string "USA" will be detected and replaced with "United States").

Figure 2:
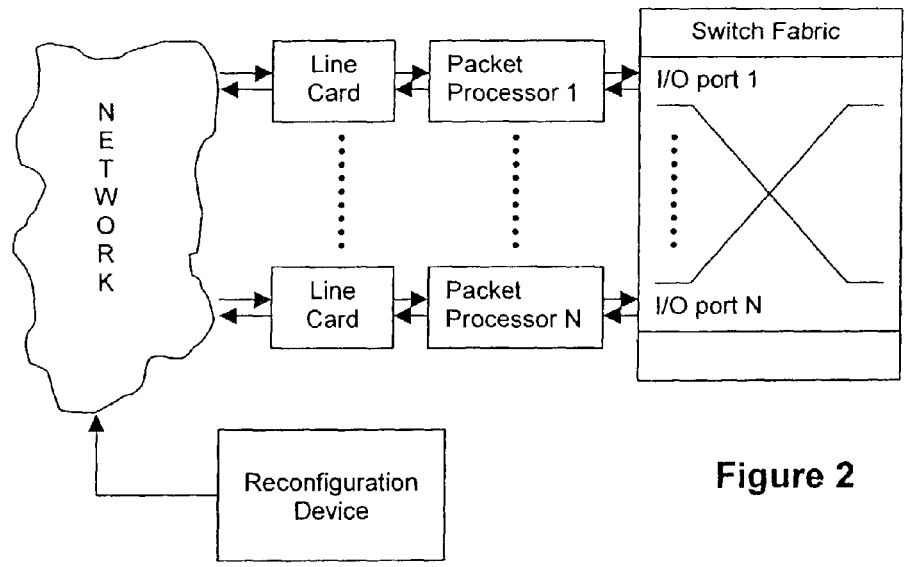
FIG. 2 is an overview of how the packet processing system of the present invention may be implemented in a high-speed computer network.

FIG. 2 illustrates the packet processor's use as a network device. In a preferred implementation, the packet processor can be used as an interface between a N×N packet switch and the line cards that carry data traffic to and from the packet switch. In the event it is desired that the packet processor be reprogrammed to scan packets for a different data pattern (or another data pattern) or carry out a different action (or another action) when matches are found, the reconfiguration device generates the necessary configuration information and transmits that information over the network to the packet processor for reprogramming thereof.

Figure 3:
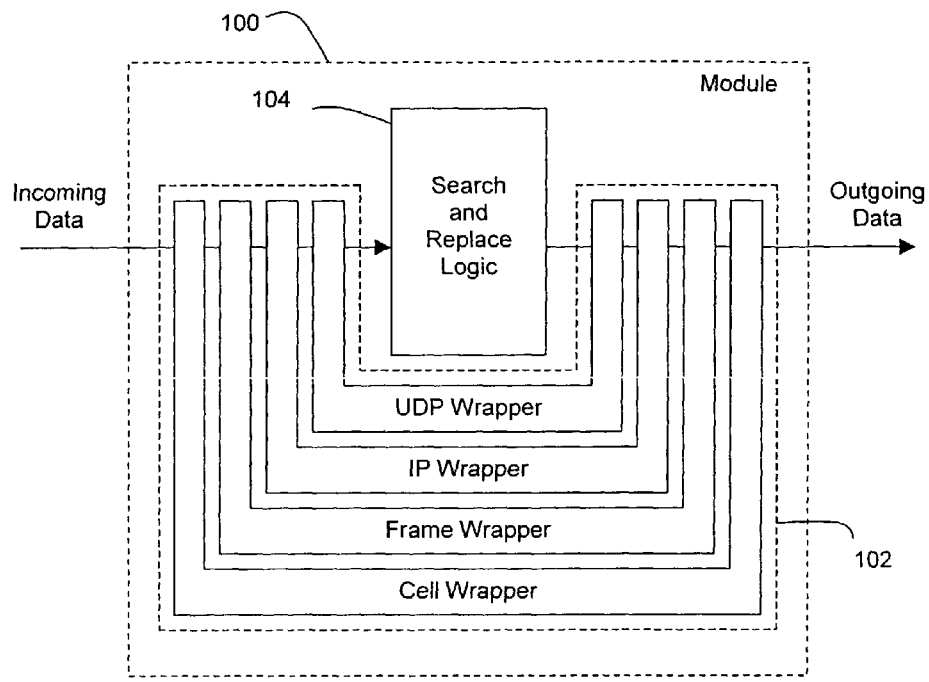
FIG. 3 is an overview of a module programmed into a PLD that is operable to provide packet processing capabilities.

FIG. 3 is an overview of the preferred packet processing module 100 that is programmed into the PLD. Incoming data is first processed by a protocol wrapper 102. On the incoming side, the protocol wrapper 102 operates to process various header information in the incoming packets and provide control information to the search and replace logic (SRL) 104 that allows SRL 104 to delineate the different portions of the packet. The control information preferably provided by the protocol wrapper 102 to SRL 104 is a start of frame (SOF) indicator that identifies the first word of a packet, a DATA_EN signal that is asserted when subsequent words of the packet are passed to SRL 104, a start of datagram (SOD) signal that identifies the first word of the UDP header, and an end of frame (EOF) signal that identifies the last word of the packet's payload.

Figure 6:
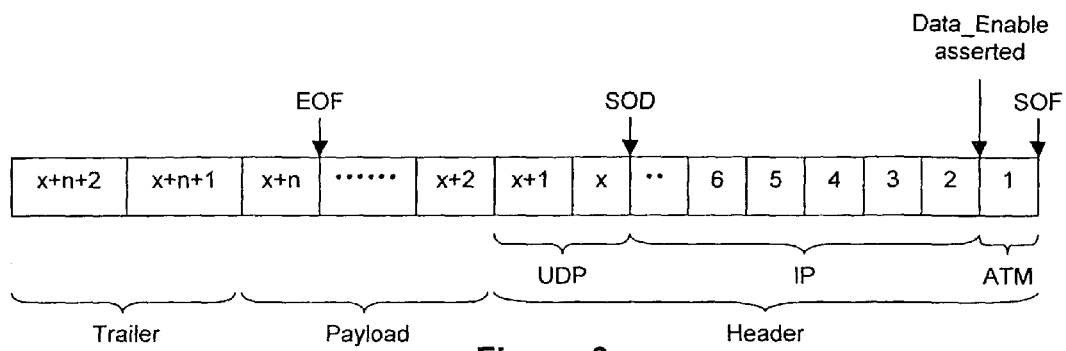
FIG. 6 is an illustration of a packet and the content of the words comprising that packet.

FIG. 6 depicts the various components and word positions of a data packet. The first word is the ATM header. The SOF signal is asserted with the arrival of the ATM header. Following the ATM header, there will be at least 5 words of IP header. The DATA_EN signal is asserted beginning with the first word of the IP header and remains asserted for all subsequent words of the packet. Following the IP header words, the first word of the UDP header is located at word position x. The SOD signal is asserted with the first word of the UDP header. The UDP header comprises two words, and at word position x+2, the payload portion of the packet begins. The EOF signal is asserted with the last word of the payload portion at word position x+n. Thus, the payload comprises some number L of words (L=n−2). The next two words at word positions x+n+1 and x+n+2 comprise the packet's trailer.

A preferred embodiment of the protocol wrapper includes a cell wrapper which verifies that the incoming packet arrived on the proper virtual circuit or flow identifier, a frame wrapper which segments incoming packets into cells and reassembles outgoing cells into packets, an IP wrapper which verifies that each incoming IP packet has the correct checksum and computes a new checksum and length for each outgoing IP packet, and a UDP wrapper which verifies that each incoming UDP packet has the correct checksum and length and computes a new checksum and length for each outgoing UDP packet.

It is preferred that pattern matching be performed only upon the payload portion of a packet. In such cases, SRL 104 uses the control information (SOF, DATA_EN, SOD, and EOF) from the protocol wrapper 102 to identify the words of the packet that comprise the payload and perform pattern matching only upon those words. However, this need not be the case.

Also, additional wrappers, such as a TCP wrapper may be included if desired by a practitioner of the invention. A TCP wrapper would read and compute checksums so that incoming packets are assembled into a continuous stream of data that is identical to the data stream that was transmitted. The TCP wrapper would drop data arriving in multiple copies of the same packet and reorder packets that arrive out of sequence.

The design and operation of the protocol wrappers is well known in the art. See, for example, F. Braun, J. W. Lockwood, and M. Waldvogel, "Layered Protocol Wrappers for Internet Packet Processing in Reconfigurable Hardware", Washington University Technical Report WU-CS-01-10, Washington University in St. Louis, Dept. of Computer Science, June 2001, the disclosure of which is incorporated herein by reference. VHDL code for the preferred protocol wrapper of the present invention is attached as a computer program listing appendix, which includes VHDL code for the cell wrapper, frame wrapper, IP wrapper, and UDP wrapper.

Received data packets arrive at SRL as a stream of 32 bit words. Also, as stated, SRL 104 will receive 4 bits of control information with each word. SRL 104 is tuned with a data pattern from the reconfiguration device and operates to determine whether a string encompassed by that data pattern is present in the incoming word stream. SRL 104 is also tuned with a replacement string to carry out a string modification operation when a matching string is found in the incoming word stream. Examples of modification operations that the SRL 104 may carry out are any awk-based modification command, including straight substitution (replacing a matching string in the packet with a replacement string), back substitution (replacing a matching string in the packet with a replacement string, wherein the replacement string includes the actual string found in the packet that caused the match), and guarded substitution (adding or removing a string from a packet that exists in the packet either prior to or subsequent to the string in the packet that caused the match).

Figure 4:
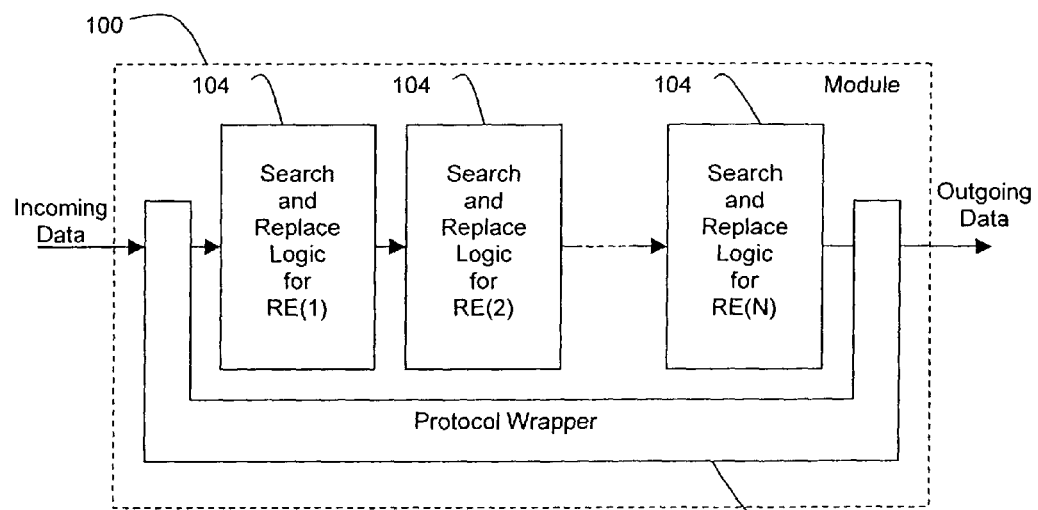
FIG. 4 is an overview of a module programmed into a PLD that is operable to provide packet processing capabilities, wherein the module is capable of search and replace functionality for more than one data pattern.

The module 100 may include a plurality N of SRLs 104 daisy-chained together, as shown in FIG. 4. Each SRL can be keyed with a different data pattern and a different modification command. By allowing the packet processor of the present invention to scan packets for more than one data pattern, the capabilities of the packet processor are greatly enhanced. For example, if three different computer viruses are known to be circulating in a computer network, the module 100 can include 3 different SRLs 104, each keyed with a data pattern designed for a different one of the computer viruses. When any of the SRLs detects a string in a packet matching its pattern, the SRL can remove the virus from the packet.

A schematic diagram of the SRL 104 is shown in FIG. 5 along with a table that lists pertinent signals in the circuit. The operation of the SRL 104 is divided between a matching path 110, a data path 112, and a controller 114. The matching path 110 determines whether the incoming data stream includes a string that matches the specified data pattern. The data path 112 outputs the incoming data stream, and, if necessary, modifies that data stream in accordance with the specified modification operation. The controller 114 uses the control bits from the protocol wrapper and the control signals it receives from the matching path to coordinate and control the operation of both the matching path 110 and the data path 112.

As stated, the main task of the matching path 110 is to determine whether an input stream includes a string that matches the specified data pattern. The matching buffer (MB) receives a 35 bit streaming signal (S1) from the protocol wrapper. 32 bits will be a word of the packet, and 3 bits will be the SOF indicator, the SOD indicator, and the EOF indicator. Preferably, the incoming word is stored as the upper 32 bits in the matching buffer (MB) at the address identified by the DATA_WR_ADD signal (CS1) coming from the controller 114 and the control bits as the lower 3 bits. If the matching buffer (MB) is full, the controller asserts the CONGESTION signal (CS10) that notifies the protocol wrapper to stop sending data on S1. The MB will output a word buffered therein at the address specified by the MB_RD_ADD signal (CS2) coming from controller 114. The upper 32 bits (the word of the incoming packet) outputted from the MB (S2) are then be passed to word-to-byte converter 1 (WBC1). The lower 3 bits (the control bits for the word) are passed to the controller (S3) so that controller can decide how to process the 32 bit word corresponding thereto.

WBC1 operates to convert an incoming stream of words into an outgoing stream of bytes. WBC1 is preferably a multiplexor having 4 input groups of 8 bits a piece. Each input group will be one byte of the 32 bit word outputted from the MB. The WBC1_SELECT signal (CS3) from the controller identifies which byte of the word is passed to the output of WBC1 (S4).

The output of WBC1 is received by the Regular Expression Finite State Machine (REFSM). The REFSM is a pattern matching state machine that processes an incoming byte stream to determine whether that byte stream includes a string that matches the data pattern with which it is keyed. Preferably, the pattern matching state machine of REFSM is implemented as a deterministic finite automaton (DFA). The REFSM processes the byte coming from WBC1 when the controller asserts the REFSM_ENABLE signal (CS4). Preferably, the controller asserts REFSM_ENABLE only when a byte of the packet's payload is present in S4.

As it processes bytes, the REFSM will produce an output signal REFSM_STATUS indicative of how the current byte being processed matches or doesn't match the data pattern with which it is keyed. REFSM_STATUS may indicate either a RUNNING state (a possible match), a RESETTING state (no match), or an ACCEPTING state (a matching string has been found). REFSM_STATUS will identify both the current state and next state of the REFSM, which depends upon the current byte being processed by the REFSM. If the REFSM processes a byte and determines that the byte is part of a string that may possibly match the data pattern (i.e., the string seen by the REFSM is "abc", the current byte is "d" and the data pattern is "abcde"), the current and next states of REFSM_STATUS will be RUNNING. If the REFSM processes a byte of a string that is a full match of the data pattern (the "e" byte has now been received), next state identified by REFSM_STATUS will be ACCEPTING. However, when the matching assignment is a longest match assignment, it must be noted that the ACCEPTING state does not necessarily mean that the REFSM's pattern matching tasks are complete. Depending on how the data pattern is defined, subsequent bytes to be processed by the REFSM may also match the data pattern. For example, if the data pattern as expressed in RE format is "abc*" (meaning that the data pattern is an "a" followed by a "b" followed by one or more "c"'s), once the REFSM has processed a byte stream of "abc", a match will have occurred, and the REFSM will be in the ACCEPTING state. However, if the next byte is also a "c", then the string "abcc" will also match the data pattern. As such, when in the ACCEPTING state, the REFSM will have to remain on alert for subsequent bytes that will continue the match. The REFSM will not know that a full match has occurred until it receives and processes a byte that is not a "c".

REFSM_STATUS will identify when a full match when its current state is ACCEPTING and its next state is RESETTING (meaning that the current byte caused the match to fail and the previous byte was thus a full match). In the above example (where the RE is "abc*"), when the input string is "abcccd", the REFSM will begin RUNNING after processing the "a", will begin ACCEPTING when the first "c" is processed, and will MATCH when the final "c" is processed and the subsequent "d" causes the state machine to RESET.

Figure 7B:
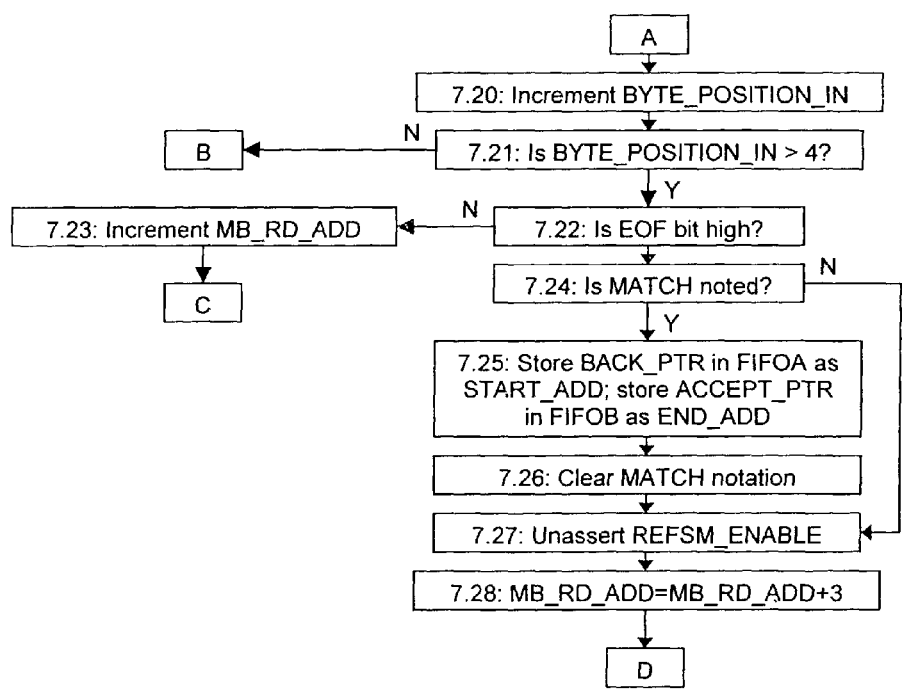
FIGS. 7(a) and 7(b) are flowcharts illustrating how the controller determines the starting position and ending position of a matching string.
Figure 7A:
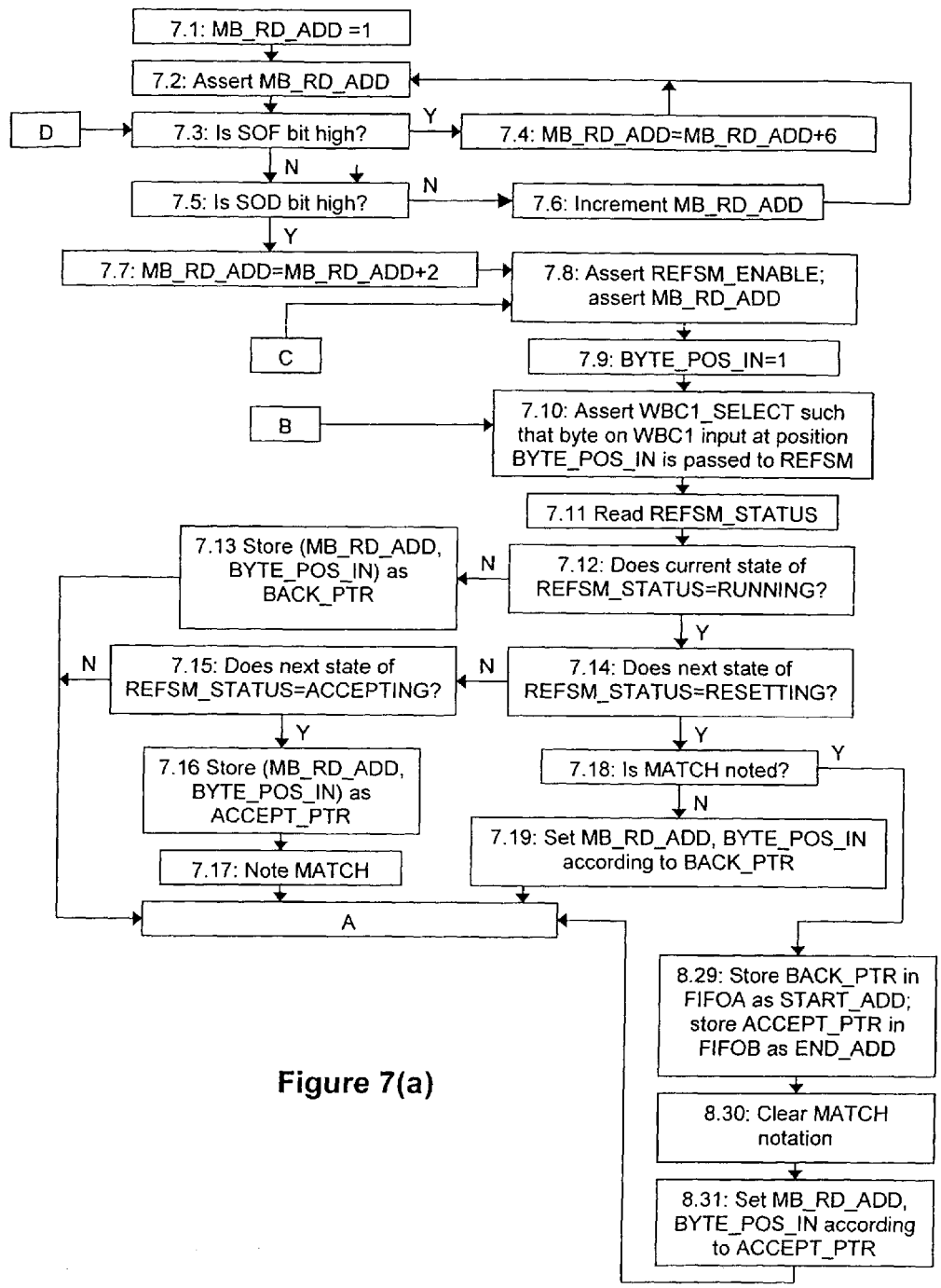

The REFSM will provide the REFSM_STATUS signal (CS5) to the controller 114 to inform the controller both its current state and its next state (which will depend on the current byte). The controller will process the REFSM_STATUS signal to determine the MB word address and byte position in that word of the first and last bytes of a full match. FIGS. 7(a) and 7(b) illustrate how the controller controls the operation of the matching path 110 in this respect.

Steps 7.1–7.7 deal with processing the control bits associated with the words in the matching buffer (MB) to identify the words in MB that comprise a packet's payload. At step 7.1, the MB_RD_ADD signal is set equal to 1. The controller then asserts MB_RD_ADD (step 7.2) and the word stored in MB at that address is outputted as S2 while the control bits associated with that word is outputted as S3. At step 7.3, the controller checks whether the SOF bit is asserted. If it is, then the controller knows that the word stored in MB at MB_RD_ADD is the packet's ATM header. Referring back to FIG. 6, it is known that the UDP header may possibly begin at word position 7 (if the IP header is 5 words long). Thus, when it is desired that the REFSM only process the packet's payload, the controller will adjust MB_RD_ADD to begin searching for the UDP header (once the first word of the UDP header is found, it is known that the first word of the payload will be two word positions later). Thus, at step 7.4, the controller sets MB_RD_ADD equal to MB_RD_ADD+6 and loops back to step 7.2.

Thereafter, on the next pass, the controller will arrive at step 7.5 and check the SOD bit associated with the word stored in MB at the location identified by the newly adjusted MB_RD_ADD signal. If the SOD bit is asserted, then the controller knows that the word stored two addresses later in MB is the first word of the payload. Thus, if SOD is high, the controller sets MB_RD_ADD equal to MB_RD_ADD+2 (step 7.7) and begins the pattern matching process at step 7.8. If the SOD bit is not high, then the controller increments MB_RD_ADD until a word is found where the SOD bit is high (step 7.6).

Starting at 7.8, the pattern matching process begins. The first word of the packet's payload is outputted from the MB and the REFSM_ENABLE signal is asserted. Next, at step 7.9, the parameter BYTE_POS_IN is set to 1. This parameter is used to identify the byte of the word in S2 that is passed to WBC1's output. The controller asserts WBC1_SELECT=BYTE_POS_IN to thereby pass the first byte of the current word to the REFSM (step 7.10).

The REFSM then processes that byte, and asserts the REFSM_STATUS signal accordingly. The controller will read this signal (step 7.11). Next, at step 7.12, the controller checks whether the REFSM_STATUS signal indicates that the current state of the REFSM is the RUNNING state. If the current state is RUNNING, the controller proceeds to step 7.13 and stores both MB_RD_ADD and BYTE_POS_IN as the parameter BACK_PTR. From there, the controller proceeds to step 7.20 where it begins the process of finding the next byte to process. The parameter BACK_PTR will be a running representation of the current byte processed by the REFSM until the REFSM's current state is RUNNING, at which time the value of BACK_PTR is frozen. Due to the nature of flip-flops in the REFSM, REFSM_STATUS will not identify the current state as RUNNING until the second byte of a possible match is received. Thus, when REFSM_STATUS identifies a current state of RUNNING and BACK_PTR is frozen, the word and byte position identified by BACK_PTR will be the first byte of a possibly matching string.

If at step 7.12, the controller determines from REFSM_STATUS that the current state of the REFSM is RUNNING (meaning that the current byte may be part of a matching string), the controller will proceed to step 7.14 and check whether the next state identified by the REFSM_STATUS signal is RESETTING. If the next state is RESETTING, this means that the current byte has caused the partial match to fail. If the next state is not RESETTING, the controller (at step 7.15) checks whether the next state is ACCEPTING. If the next state is neither RESETTING nor ACCEPTING, this means that the next state is still RUNNING, in which case the controller proceeds to step 7.20 to follow the process for obtaining the next byte of payload.

If at step 7.15, the controller determines that the next state is ACCEPTING, then this means that the REFSM has found a full match, but has not yet determined the full boundaries of the match. However, the controller does know that the word address and byte position of the current byte may be the word address and byte position of the last byte of the match. As such, the controller, at step 7.16, stores MB_RD_ADD and BYTE_POS_IN as the value ACCEPT_PTR. Then, at step 7.17, the controller notes that a match has occurred, and proceeds to step 7.20 to get the next byte.

As the next byte is processed and step 7.14 is once again reached, the controller will once again check whether the next state identified by REFSM_STATUS is RESETTING. If the next state is RESETTING, the controller proceeds to step 7.18 where it checks whether a match has been previously noted by the controller. If no match had been noted, the controller will determine that the string starting at the byte identified by BACK_PTR is not a match of the data pattern. Thus, the controller needs to set MB_RD_ADD and BYTE_POS_IN such that the REFSM will process the byte immediately after BACK_PTR, because the byte stored at that address needs to be checked to determine whether it may be the beginning of a matching string. The controller achieves this by setting MB_RD_ADD and BYTE_POS_IN equal to the values stored in BACK_PTR (step 7.19). From there, the controller proceeds to step 7.20 to get the next byte.

However, in the example where the controller had already noted that a match occurred at step 7.17, then, when the controller subsequently arrives at step 7.18, the controller will proceed to step 7.29. When step 7.29 is reached, this means that the full boundaries of a matching string have been processed by the REFSM. The current byte has caused the REFSM to determine that its next state is RESETTING. However, the previous byte (whose location is identified by ACCEPT_PTR) will be the last byte of the matching string. Also, the value of BACK_PTR will be the address of the first byte of the matching string. Thus, the controller will know the address of the first and last bytes of the longest matching string in the packet's payload. At step 7.29, the controller will store the value of BACK_PTR in FIFO A as START_ADD (CS6 in FIG. 5). Also, the controller will store the value of ACCEPT_PTR in FIFO B as END_ADD (CS8 in FIG. 5). Next, at step 7.30, the controller will clear its match notation. Then, at step 7.31, the controller will set the MB_RD_ADD and BYTE_POS_IN to the values stored in ACCEPT_PTR and proceed to step 7.20 so the byte immediately following the byte identified by ACCEPT_PTR is processed. Once START_ADD is queued in FIFO A and END_ADD is queued in FIFO B, the controller will be able to appropriately modify outgoing packets because it will know the boundaries of the longest matching string in the packet to be modified.

From step 7.20, the controller begins the process of obtaining the next byte. At step 7.20, BYTE_POS_IN is incremented, and then the controller checks whether BYTE_POS_IN is greater than 4 at step 7.21. If BYTE_POS_IN is not greater than 4, then the controller knows that another byte of the current word on an input line of WBC1 needs to be processed. Thus, the controller loops back to step 7.10 to begin processing that byte. If BYTE_POS_IN is greater than 4, then the controller knows that all bytes of the current word have been processed and the next word in MB needs to be obtained. Before getting the next word, the controller checks whether the EOF bit for the current word is high (step 7.22).

If the EOF bit is high, this means that the current word is the last word of the payload, in which case the pattern matching process for the packet is complete. REFSM_ENABLE is unasserted and MB_RD_ADD is set equal to MB_RD_ADD+3 to begin processing the next packet (steps 7.27 and 7.28). Also, to account for the situation where the last byte of the last word of the packet payload is the byte that caused a full match condition to exist, the controller proceeds through steps 7.24, 7.25, and 7.26 that parallel steps 7.18, 7.29, and 7.30. If the EOF bit is not high, this means that the current word is not the last word of the payload and the bytes of the next word need to be processed through the REFSM. Thus, the controller increments MB_RD_ADD (step 7.23) and loops back to step 7.8 to begin processing the word stored in MB at MB_RD_ADD.

The primary task of data path 112 is to output incoming data, and, if necessary, modify that data. The replacement buffer (REPBUF) in the data path stores a replacement string that is to be inserted into the data stream in place of each matching string. Together, the REPBUF and MUX act as a string replacement machine, as will be explained below. The replacement string stored in REPBUF is provided by a user when the packet processing module is first generated.

The data buffer (DB) will receive the same 35 bits (S1) as does MB. The controller will also use the same DATA_WR_ADD (CS1) to control the writing of words to DB as it does for MB. The DB and the MB will be identical buffers. The controller will use the DB_RD_ADD signal (CS11) to control which words are read from DB.

Word-to-byte converter 2 (WBC2) will operate as WBC1 does; it will break incoming 32 bit words (S7) into 4 bytes and pass those bytes to WBC2's output according to the WBC2_SELECT signal (CS12). Signal S6 will carry the 3 control bits associated with the word read out of DB from address DB_RD_ADD.

Figure 8:
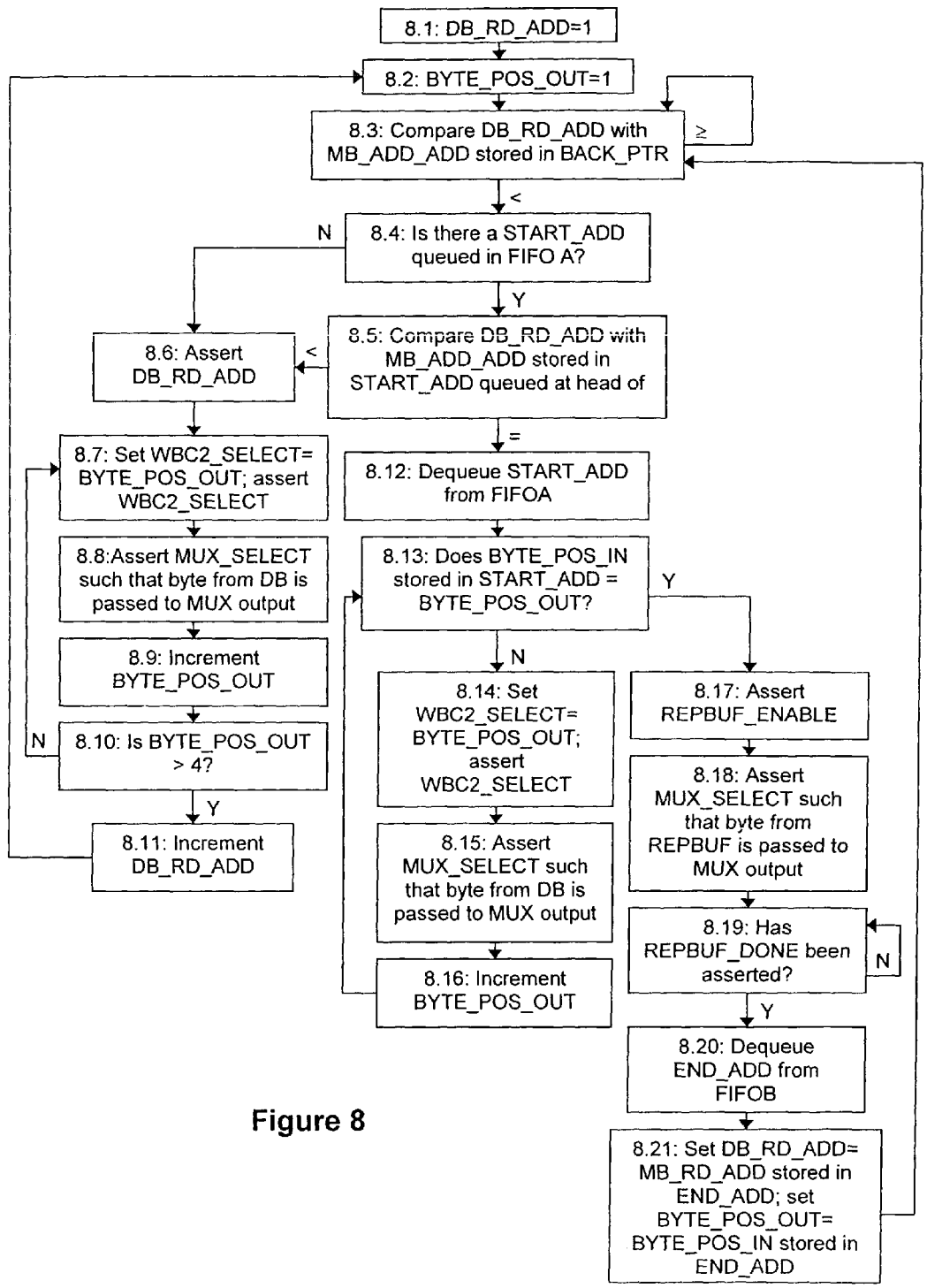
FIG. 8 is a flowchart illustrating how the controller controls the outputting of data, including the replacement of a matching string with a replacement string.

A byte is not available for output from the data path until the matching path has already determined whether that byte is part of a matching string. FIG. 8 illustrates how this safeguard is achieved. After DB_RD_ADD and BYTE_POS_OUT are initialized (steps 8.1 and 8.2), the controller compares DB_RD_ADD with the MB_RD_ADD stored in BACK_PTR (step 8.3). The controller will not read a word out of DB if the address of that word is greater than or equal to the MB_RD_ADD stored in BACK_PTR. In such cases, the controller waits for the MB_RD_ADD in BACK_PTR to increase beyond DB_RD_ADD. When DB_RD_ADD is less than MB_RD_ADD in BACK_PTR, the controller proceeds to step 8.4 and checks whether the matching path has found a match (is FIFOA empty?). If a match has not been found by the matching path, the controller follows steps 8.6 through 8.11 to output the bytes of that word.

At step 8.6, DB_RD_ADD is asserted, thereby passing the word stored in DB at that address to WBC2 (S7). At step 8.7, WBC2_SELECT is set equal to BYTE_POS_OUT to thereby cause the byte identified by BYTE_POS_OUT to be passed to the WBC2 output (S9). Thereafter, at step 8.8, MUX_SELECT is asserted to pass the output of WBC2 to the output of the MUX (S10). Then, the controller increments BYTE_POS_OUT and repeats steps 8.7 through 8.10 until each byte of the current word is passed through the MUX. When all bytes have been passed through the MUX, DB_RD_ADD is incremented (step 8.11) and the controller loops back to step 8.2.

If step 8.4 results in a determination that there is a START_ADD queued in FIFOA, then the controller compares DB_RD_ADD with the MB_RD_ADD stored with the START_ADD at the head of FIFOA (step 8.5). IF DB_RD_ADD is less than the MB_RD_ADD stored with START_ADD, steps 8.6 through 8.11 are followed because the word at DB_RD_ADD is not part of a matching string. However, if DB_RD_ADD equals the MB_RD_ADD stored with the dequeued START_ADD, then the controller next needs to identify which byte of the current word (the word at DB_RD_ADD) is the starting byte of the matching string. Thus, at step 8.13 (after START_ADD is dequeued from FIFOA at step 8.12), the controller compares BYTE_POS_OUT with the BYTE_POS_IN stored in START_ADD. IF BYTE_POS_OUT does not equal the BYTE_POS_IN stored in START_ADD, then that byte is not part of the matching string and the controller follows steps 8.14 through 8.16 to pass that byte to the MUX output. Steps 8.14 through 8.16 parallel steps 8.7 through 8.9. Eventually, when the controller returns to step 8.13, BYTE_POS_OUT will match the BYTE_POS_IN stored with the dequeued START_ADD. When this occurs, the controller initiates the string replacement process at step 8.17.

At step 8.17, the controller asserts REPBUF_ENABLE (CS13), and then asserts MUX_SELECT such that the output (S8) of replacement buffer (REPBUF) is passed to the MUX output. When REPBUF is enabled, it begins outputting bytes of the replacement string stored therein. Because MUX_SELECT is asserted to pass S8 to the MUX output, the data path will insert the replacement string stored in REPBUF in the data path. By passing the replacement string to the MUX output rather than the matching string, the data path thereby replaces the matching string in the data stream with the replacement string. FIG. 9 illustrates the operation of REPBUF.

REPBUF will have an array that stores the bytes of the replacement string. The pointer ARRAY_RD_ADD will identify which byte of the replacement string is to be outputted. After ARRAY_WR_ADD is initialized at step 9.1, REPBUF checks for the REPBUF_ENABLE signal from the controller (step 9.2). Once REPBUF_ENABLE is received, REPBUF outputs the byte stored at ARRAY_RD_ADD. At step 9.3, REPBUF checks whether ARRAY_RD_ADD points to the last byte of the replacement string. If it does not, ARRAY_RD_ADD is incremented and the next byte is outputted (step 9.6 back to 9.3). When ARRAY_RD_ADD reaches the last byte of the replacement sting, REPBUF_DONE (CS14) is asserted to notify the controller that the entire replacement string has been outputted (step 9.5) and ARRAY_RD_ADD is reset to its initial value.

Returning to FIG. 8, after REPBUF_ENABLE is asserted and MUX_SELECT is asserted to pass S8 to S10, the controller waits for the REPBUF_DONE signal from REPBUF (step 8.19). Once REPBUF_DONE is received, the controller determines the next byte to process through the data path. This next byte will be the byte immediately following the last byte of the matching string. The controller achieves this objective by dequeuing END_ADD from the head of FIFOB (step 8.20), setting DB_RD_ADD and BYTE_POS_OUT equal to the values in END_ADD (step 8.21), and returning to step 8.3.

The stream of bytes exiting the MUX (S10) will be ready to exit the SRL once they have been reconverted into a word stream. The byte-to-word converter (BWC) will perform this task. FIG. 10 illustrates the operation of BWC. The controller controls the operation of BWC with a BWC_ENABLE signal (CS16). A counter in BWC will track each byte received. The counter is initialized at 0 (step 10.1). BWC will also track how many padding bytes are needed to complete a word. For example, if word being assembled by BWC is to be the last word of the payload and only two bytes are received for that word, two padding bytes will be necessary to complete the word. Thus, the parameter PADDING_COUNT is used as a running representation of how many more bytes are needed by BWC to fill the word. At step 10.2, PADDING_COUNT is set equal to (4-counter). At step 10.3, BWC checks whether the controller has asserted the BWC_ENABLE signal. If it has, BWC receives a byte from MUX output (or possibly a padding byte from the controller via S12) (step 10.4). At step 10.5, BWC checks whether the counter equals 3. When the counter equals 3, BWC will know that the current byte it has received is the last byte of a word. In this situation, the current byte and the other 3 bytes that will have been stored by BWC are passed to the BWC output (S11) as a 32 bit word (step 10.6). Also, because none of the bytes of the word will be padding bytes, PADDING_COUNT will equal 0. BWC provides the PADDING_COUNT signal (CS17) to the controller so that the controller can decide whether a padding byte needs to be passed to BWC via signal S12. From step 10.6, BWC returns to step 1 and resets the counter.

If the counter does not equal 3 at step 10.5, then, at step 10.7, BWC stores the received byte at internal address BWC_ADD where BWC_ADD equals the counter value. Thereafter, the counter is incremented (step 10.8) and BWC returns to step 2.

FIG. 11 illustrates how the controller processes the PADDING_COUNT signal from BWC to determine whether a padding byte needs to be provided to BWC. At step 11.1, the controller receives PADDING_COUNT from BWC, and at step 11.2, the controller sets the parameter TRACK_PADDING equal to PADDING_COUNT. Thereafter, the controller checks whether the word being built by BWC is to be the last word of the packet's payload (step 11.3). Because of the replacement process, the byte length of the payload may be altered, which may result in the need to use padding bytes to fill the last word of the payload. If the word being built is to be the last word of the payload, then at step 11.4, the controller checks whether TRACK_PADDING is greater than 0. If it is, a padding byte is sent to BWC (S12) at step 11.5, TRACK_PADDING is decremented (step 11.6), and the controller returns to step 11.4. If 11.4 results in a determination that TRACK_PADDING equals 0, then no padding bytes are needed and the controller returns to step 11.1.

Also, the string replacement process may result in the need to alter the headers and trailers for a packet. The controller is configured to make the necessary changes to the headers and trailers. The words exiting BWC via S11 will be passed to the protocol wrapper 102 for eventual output. Control bits for the outgoing words are asserted by the controller as signal S13 and passed to the protocol wrapper 102.

Now that the packet processing module has been described, attention can be turned toward the hardware within which it is implemented. A preferred platform for the packet processor is Washington University's Field-Programmable Port Extender (FPX). However, it must be noted that the present invention can be implemented on alternate platforms, provided that the platform includes a PLD with supporting devices capable of reprogramming the PLD with different modules.

Figure 12:
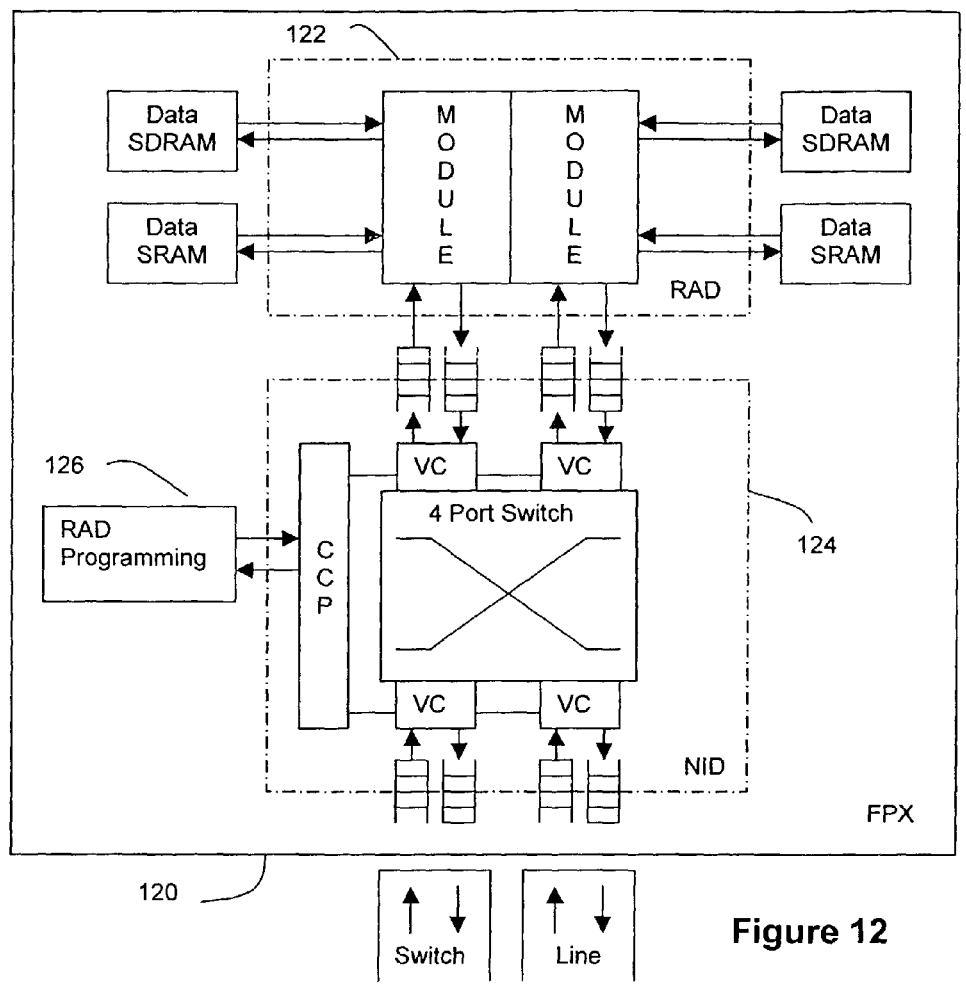
FIG. 12 is a diagram of the Field-Programmable Port Extender (FPX) platform.

Details about the FPX platform are known in the art. See, for example, Lockwood, John et al., "Reprogrammable Network Packet Processing on the Field Programmable Port Extender (FPX)", ACM International Symposium on Field Programmable Gate Arrays (FPGA 2001), Monterey, Calif., Feb. 11–12, 2001; See also, Lockwood, John, "Evolvable Internet Hardware Platforms", NASA/DoD Workshop on Evolvable Hardware (EHW '01), Long Beach, Calif., Jul. 12–14, 2001, pp. 271–279; and Lockwood, John et al., "Field Programmable Port Extender (FPX) for Distributed Routing & Queuing", ACM International Symposium of Field Programmable Gate Arrays (FPGA 2000), Monterey, Calif., February 2000, pp. 137–144, the disclosures of which are hereby incorporated by reference. A diagram of the FPX is shown in FIG. 12. The main components of the FPX 120 are the Reprogrammable Application Device (RAD) 122 and the Network Interface Device (NID) 124.

The RAD 122 is a field programmable gate array (FPGA) A preferred FPGA is the Xilinx XCV 100E manufactured by the Xilinx Corp. of San Jose, Calif. However, any FPGA having enough gates thereon to handle the packet processing module of the present invention would be suitable. Programmed into the RAD 122 will be a packet processing module as described in connection with FIGS. 3–11. In a preferred embodiment, the RAD 122 can be programmed with two modules, one to handle incoming traffic (data going from the line card to the switch) and one to handle outgoing traffic (data going from the switch back out to the line card). For ingress and egress processing, one set of SRAM and SDRAM is used to buffer data as it arrives, while the other SRAM and SDRAM buffers data as it leaves. However, it should be noted that the RAD 122 can be implemented with any number of modules depending upon the number of gates on the FPGA.

The NID 124 interfaces the RAD with the outside world by recognizing and routing incoming traffic (which may be either coming from the switch or the line card) to the appropriate module and recognizing and routing outgoing traffic (which may be either going to the switch or the line card) to the appropriate output. The NID is also preferably an FPGA but this need not be the case. Another task of the NID 124 is to control the programming of the RAD. When the reconfiguration device transmits configuration information to the packet processor to reprogram the packet scanner with a new module, the NID 124 will recognize the configuration information as configuration information by reading the header that the reconfiguration device includes in the packets within which the configuration information resides. As the NID receives configuration information, the configuration information will be stored in the RAD programming SRAM 126. Once the NID has stored all of the configuration information in the RAD Programming SRAM, the NID will wait for an instruction packet from the reconfiguration device that instructs the NID to reprogram the RAD with the module defined by the configuration information stored in the SRAM 126. Once in receipt of the instruction packet, the NID loads the configuration information into the RAD by reading the configuration information out of the SRAM 126 and writing it to the reconfiguration ports of the FPGA.

Another feature of the FPX that makes it desirable for use with the present invention is that the FPX is capable of partially reprogramming the RAD while the RAD is still capable of carrying out tasks with the existing module. The FPX supports partial reprogramming of the RAD by allowing configuration streams to contain commands that specify only a portion of the logic on the RAD is to be programmed. Rather than issue a command to reinitialize the device, the NID just writes frame of configuration information to the RAD's reprogramming port. As such, the existing module on the RAD can continue processing packets during the partial configuration.

Figure 13:
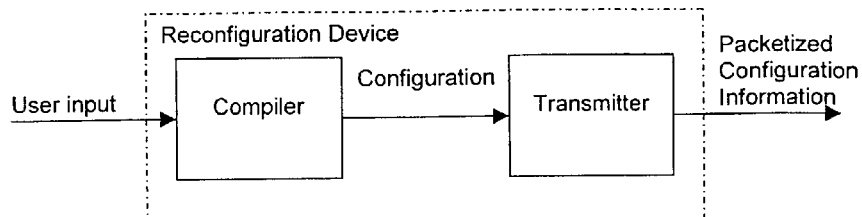
FIG. 13 is an overview of the reconfiguration device of the present invention.

An overview of the reconfiguration device of the present invention is shown in FIG. 13. Main components of the reconfiguration device are a compiler which receives input from a user and generates the configuration information therefrom that is used to reprogram the packet processor, and a transmitter which communicates the configuration information to the packet processor over the network. The reconfiguration device is preferably implemented on a general purpose computer connected to the network, wherein the compiler is preferably software resident thereon, and wherein the transmitter utilizes the network interface also resident thereon. However, alternative implementations would be readily recognizable by those of ordinary skill in the art.

The compiler of the present invention is a powerful tool that allows users to reprogram the reprogrammable packet processor with minimum effort. All that a user has to do is provide the compiler with a data pattern and an action command, and the compiler automates the intensive tasks of designing the module and creating the configuration information necessary to program that module into the packet processor. This streamlined process provides flexibility in reprogramming high-speed packet scanners that was previously unknown in the art.

As an input, the compiler receives two items from a user: (1) the regular expression that defines the data pattern against which packets will be scanned, and (2) the action command which specifies how the packet processor is to respond when packets having a matching string are found. From this input information, the compiler generates the two dynamic components of FIG. 5—the pattern matching state machine (REFSM) and the replacement buffer (REPBUF). The REFSM will be tuned to determine whether data applied thereto includes a string that matches the user-specified data pattern, and, when the action command specifies a string replacement operation, the REPBUF will be tuned to output a replacement string in accordance with the user-specified string replacement command when activated by the controller.

Also, the compiler will retrieve VHDL representations of the static components of FIGS. 3–5 that are stored in memory (the protocol wrapper, the twin word buffers MB and DB, the word-to-byte converters WBC1 and WBC2, the controller, the MUX, and the byte-to-word converter BWC). The compiler will integrate the dynamically-created components with the static components to create a logical representation (preferably a VHDL representation) of the packet processing module. FPGA synthesis tools available in the art can convert the VHDL representation of the module into a bitmap operable to program a FPGA with the module. The bitmap of the module serves as the configuration information to be transmitted over the network to the packet processor.

The transmitter operates to packetize the configuration information so it can be communicated over the network to the packet processor. Packetization of data destined for a computer network is well-known in the art and need not be repeated here. However, it should be noted that the transmitter needs to include information in the headers of the packets containing configuration information that will allow the packet processor to recognize those packets as containing configuration information (so that the packet processor can then reprogram itself with that configuration information).

Figure 14:
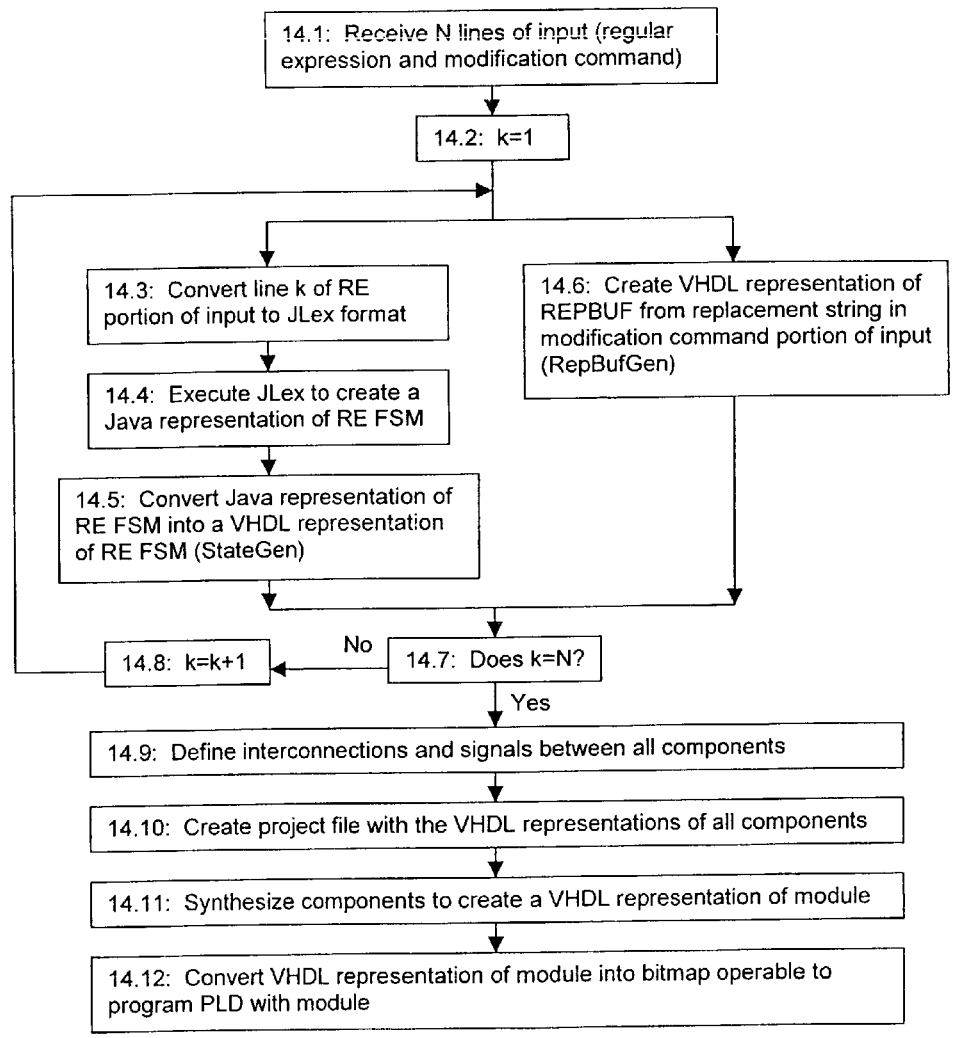
FIG. 14 is a flowchart illustrating the operation of the compiler

FIG. 14 illustrates the operation of the compiler of the present invention. At step 14.1, the compiler receives N lines of input from a user. This input may come either directly from a user via an input device such as a keyboard, it may come indirectly from a user via a web interface, or it may come indirectly from a user via additional software. Each line k of input may specify a different data pattern and action command. Preferably, this input is provided in RE and awk format. Included in the computer program listing appendix is an example of input that a user can provide to the compiler. The example shown in the computer program listing appendix is a search and replace operation wherein the data pattern (defined by the RE) is "t.*t" and the replacement string is "this is a test". The compiler will generate configuration information from this input that defines a module operable to detect a string in a packet that matches the pattern "t.*t" and then replace that string with "this is a test".

A high level script called BuildApp is run by the compiler to begin the generation of the configuration information. The code for BuildApp is also included in the computer program listing appendix. Steps 14.2 through 14.10 are performed by BuildApp. After index k is initialized to 1 at step 14.2, the compiler sets out to generate the pattern matching state machine (REFSM) and the string replacement machine (REPBUF).

An important tool used by the present invention in the automated creation of the REFSM is the lexical analyzer generator. A lexical analyzer generator is a powerful tool that is executable to receive a regular expression and generate a logical representation of pattern matching state machine therefrom that is operable to determine whether an input stream includes a string that matches the data pattern defined by the regular expression. Lexical analyzer generators are known in the art, and the inventors herein have found that the lexical analyzer generator known as JLex is an excellent lexical analyzer generator for use in connection with the present invention. JLex is publicly-available software developed by Elliot Joel Berk that can be obtained over the Internet.

At step 14.3, the compiler converts line k of the user input into a format readable by the lexical analyzer generator for creating the logical representation of the pattern matching state machine. Preferably, when JLex is used as the lexical analyzer generator, step 14.3 operates to convert line k of the input into the format used by JLex. A script called CreateRegEx is called by BuildApp to perform this task. The code for CreateRegEx is included in the computer program listing appendix. The computer program listing appendix also includes the output of CreateRegEx for the above example where the RE input is "t.*t".

At step 14.4, the lexical analyzer generator is executed to create a representation of the pattern matching state machine (REFSM) that is tuned with the data pattern defined by the regular expression found in line k of the user input. If JLex is used as the lexical analyzer generator, JLex will create a Java representation of REFSM. The computer program listing appendix further includes the Java representation of the pattern matching state machine for the exemplary RE of "t.*t" (jlex_in.java).

Thus, at step 14.5 an additional operation is needed to convert the Java representation of the REFSM to a VHDL representation of the pattern matching state machine. A script called StateGen will parse the Jlex output (jlex_in.java) to create the VHDL representation of the pattern matching state machine. StateGen is also included in the computer program listing appendix. The VHDL entity created by StateGen is saved as RegEx_FSM{k}.vhd (wherein k is the line of user input from which the REFSM was generated). The computer program listing appendix also includes the VHDL code for the pattern matching state machine made from the example where the RE is "t.*t" (RegEx_FSM1.vhd).

At step 14.6, the compiler generates a VHDL representation of the replacement buffer (REPBUF) from line k of the user input. A script called ReplaceBufGen (see the computer program listing appendix) will control the creation of the replacement buffer. The VHDL representation of the replacement buffer will operate as described in connection with FIG. 8. The computer program listing appendix also includes the VHDL code for the REPBUF in the above example where the replacement string is "this is a test".

After the dynamic components for line k=1 of the user input are created, at step 14.7, the compiler checks whether there is another line of input. If there is, the compiler proceeds to step 14.8 to increment k, and then loops back to steps 14.3 through 14.6. Once dynamic components have been generated for all lines N of user input, the compiler will have VHDL representations of all N REFSMs and N REPBUFs.

Next, at step 14.9, the compiler, through the BuildApp script, defines the interconnections and signals that will be passed between all of the static and dynamic components of the search and replace logic (SRL). VHDL representations of the static components of the SRL will be stored in memory accessible by the compiler. The computer program listing appendix includes the VHDL code for these static components (controller.vhd (which encompasses the controller, word-to-byte converters, and MUX), character-.buf.vhd (which encompasses the word buffers), and wrd-_bldr.vhd (which defines the byte-to-word converter)). The VHDL representation of the SRL submodule is listed in the computer program listing appendix as RegEx_App.vhd. Further, the compiler, through the BuildApp script, defines the interconnections and signals that will be passed between the various wrappers and the SRL to create a VHDL representation of the packet scanning module. VHDL code for the wrappers will also be stored in memory accessible by the compiler. The computer program listing appendix includes the VHDL code for the wrappers and the computer program listing appendix includes the resultant VHDL code for the packet scanning module (regex_module.vhd).

Then, at step 14.10, the compiler through BuildApp creates a project file which includes a list of the file names for the VHDL representations of all dynamic and static components of the module. BuildApp calls a script named MakeProject to carry out this task. MakeProject is included in the computer program listing appendix, as is its output file RegEx_App.prj.

Further, at step 14.11, the compiler will synthesize the components listed in the project file to create a backend representation of the module. Synthesis tools known in the art may be used for this task, and the inventors have found that the synthesis tool Synplicity Synplify Pro from Synplicity, Inc. of Sunnyvale, Calif., is highly suitable. Synplicity Synplify Pro is available on-line at http://www.synplicity.com. The backend module representation created by the synthesis tool is then provided to a backend conversion tool for the reprogrammable hardware (preferably a FPGA conversion tool such as a Xilinx backend conversion tool) to generate a bitmap that is operable to program the packet scanning module into the reprogrammable hardware. This bitmap is the configuration information that defines the module programmed into the PLD of the packet scanner, and may subsequently be transmitted over the network to the packet scanner.

While the present invention has been described above in relation to its preferred embodiment, various modifications may be made thereto that still fall within the invention's scope, as would be recognized by those of ordinary skill in the art.

For example, the packet processing system of the present invention has been described wherein its environment is a computer network and the data stream it processes is a stream of data packets transmitted over the network. However, this need not be the case. The packet processing system of the present invention may be used to process any data stream, no matter its source. For example, the present invention can be used to process streaming data being read from a data source such as a disk drive, a tape drive, a packet radio, a satellite receiver, a fiber optic cable, or other such media.

Also, the SRL used by the packet processing module has been described wherein a single REFSM is used to scan payload bytes. To speed the operation of the SRL, a plurality of REFSMs, each keyed with the same data pattern, may be implemented in parallel. FIG. 13 illustrates how the matching path 110 of the SRL can implement parallel REFSMs. Each REFSM can be used to process the byte stream starting from a different byte. For a byte stream $\{B_1, B_2, \ldots B_N \ldots B_M\}$, the controller can activate the MB_RD_ADD(1) and WBC1_SELECT) (1) such that the byte stream $\{B_1 \ldots B_M\}$ is provided to REFSM(1), activate MB_RD_ADD(2) and WBC1_SELECT(2) such that the byte stream $\{B_2 \ldots B_M\}$ is passed to REFSM(2), activate MB_RD_ADD(3) and WBC1_SELECT(3) such that the byte stream $\{B_3 \ldots B_M\}$ is passed to REFSM(3), and so on for N REFSMs. In this configuration, time will not be wasted processing a non-matching string starting at byte 1 because another REFSM will already be processing a potentially matching string starting at byte 2. The controller can be modified to account for situations where more than one REFSM detects a match. For example, where REFSM(1) has found a match for string $\{B_1, B_2, \ldots B_6\}$ and REFSM(2) has found a match for string $\{B_2, B_3, \ldots B_6\}$, the controller can be designed to choose the longest matching string (i.e., $\{B_1, B_2, \ldots, B_6\}$).

Figure 15:
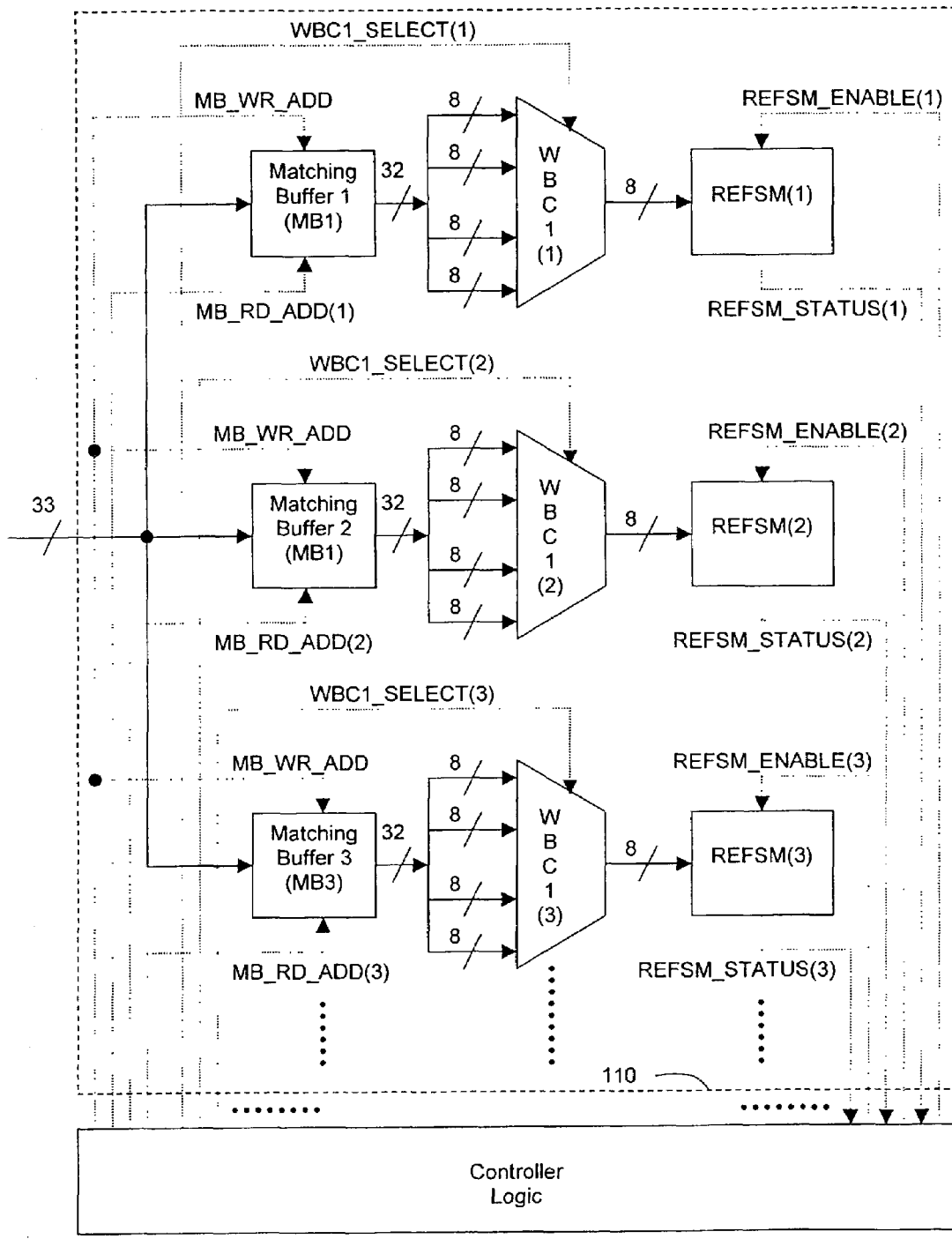
FIG. 15 is a diagram of an implementation of the matching path of the search and replace logic wherein multiple pattern matching state machines operate in parallel.

Also, each parallel REFSM in FIG. 15 can be keyed with a different data pattern. The same byte stream can be provided to each REFSM, and the controller can process each REFSM_STATUS signal to determine which data patterns are present in the data stream.

Further, the packet processor has been described above wherein the action performed thereby when a match is found is a straight replacement operation. However, a wide variety of additional actions may also be readily implemented. Rather than replace a matching string, the processor can be configured to drop a packet that includes a matching string by not outputting such a packet from the processing module. Also, the data path of the processing logic can be configured to output a notification packet addressed to an interested party when a matching string is found. Such a notification packet may include a copy of the packet that includes the matching string. Also, because the present invention allows the packet processor to not only identify that a match has occurred but also identify the matching string as well as the data pattern with which a string is matched, such information can be used to gather statistics about the data stream. Appropriate signals can be passed to a statistic-keeping device that monitors the content of the data stream.

Figure 16:
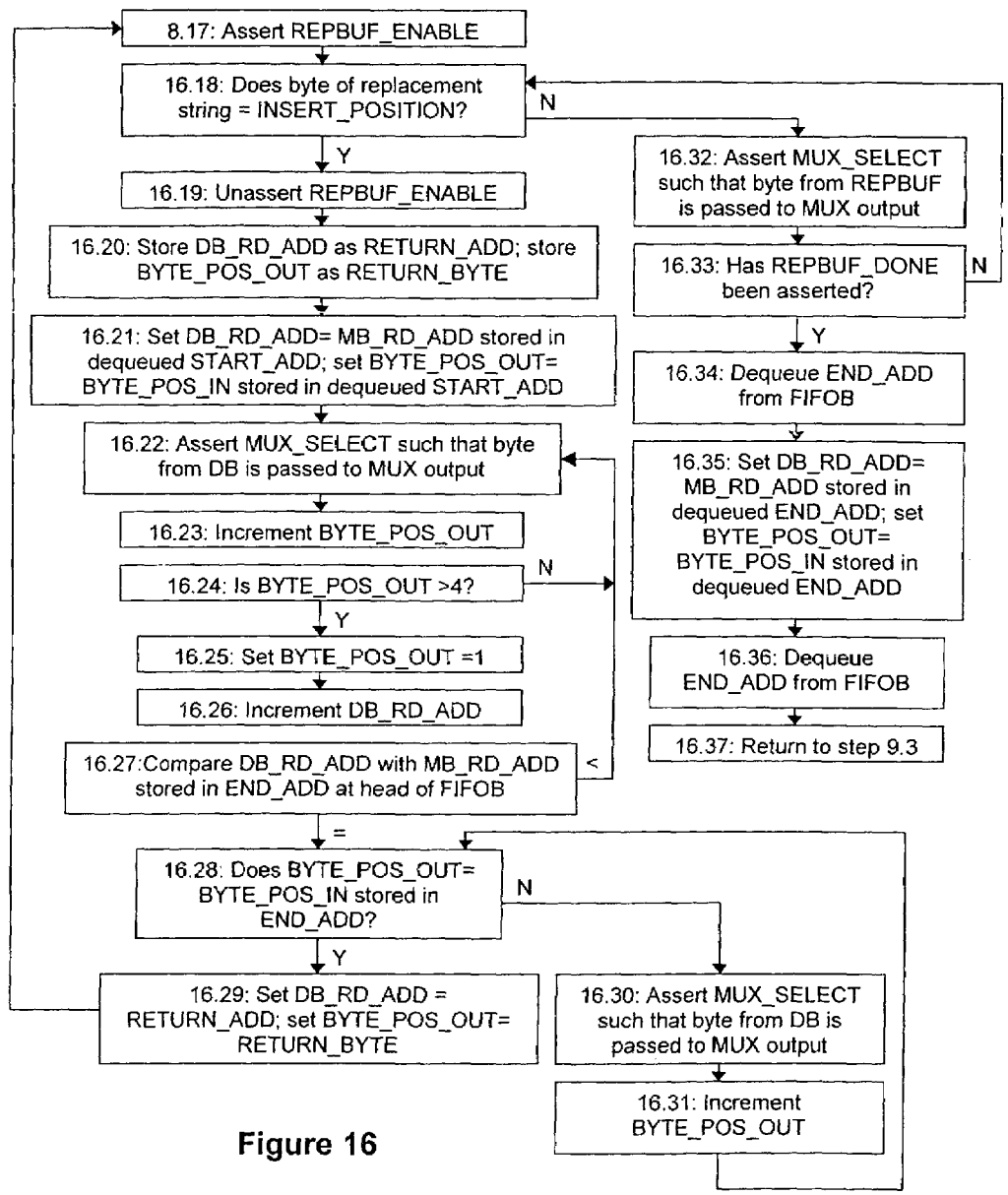
FIG. 16 is a flowchart illustrating how the controller controls the outputting of data wherein the data modification operation is a back substitution operation.

Further still, when a back substitution operation is desired rather than a straight substitution operation (in a back substitution operation, the replacement string will include at least one copy of the matching string), the algorithm of FIG. 8 can be modified in accordance with FIG. 16. FIG. 16 picks up from step 8.17 in FIG. 8. In back substitution, the replacement string will include a byte that indicates the matching string is to be inserted into the data stream. When this byte is outputted from REPBUF, the controller freezes REPBUF and reads and passes the matching string from DB to WBC2 to MUX output. Once the matching string is inserted in the data stream, the controller reactivates REPBUF to continue the outputting of the replacement string.

Also, the matching path of SRL 104 can be configured for case insensitivity (wherein upper case letters are treated the same as lower case letters) by adding a case converter between the output of WBC1 and the input of REFSM. The case converter will be operable to convert each incoming byte to a common case (either all caps or all lower case) that matches the case of the data pattern with which the REFSM is tuned. For example, the case converter would convert the stream "abcDefghIJKlm" to stream "ABCDEFGHIJKLM" when case insensitivity is desired and the REFSM is tuned with a data pattern defined by all capital letters.

Further, the packet processor has been described wherein it is implemented as a stand-alone device on the FPX that interfaces a line card and a packet switch. However, one of ordinary skill in the art would readily recognize that the reprogrammable packet processor may be implemented as an internal component of any network processing device (such as a packet switch).

Further still, the packet processor of the present invention may be used with all manner of networks, such as the Internet or various local area networks (LANs) including wireless LANs. For example, the packet processor can be fitted with a wireless transceiver to receive and transmit wireless data to thereby integrate the packet processor with a wireless network (wireless transceivers being known in the art).

These and other modifications to the preferred embodiment will be recognizable upon review of the teachings herein. As such, the full scope of the present invention is to be defined by the appended claims in view of the description above, attached figures, and the computer program listing appendix.

What is claimed is:

1. A method of processing a stream of network data through a programmable logic device (PLD), said method comprising:
configuring the PLD having:
a first logic circuit adapted to:
(1) determine whether a stream of network data applied thereto includes a string matching a first regular expression pattern, and
(2) perform a first responsive action if said network data stream includes the string matching said first regular expression pattern; and
a second logic circuit adapted to:
(1) determine whether the stream of network data applied thereto includes a string matching a second regular expression pattern, and
(2) perform a second responsive action if said network data stream includes the string matching said second regular expression pattern; and
processing a stream of network data through said first logic circuit of said configured PLD to:
(1) determine whether said network data stream includes the string matching said first regular expression pattern, and
(2) perform said first responsive action if said network data stream includes the string matching said first regular expression pattern; and
while the first logic circuit processes the stream of network data, processing the stream of network data through said second logic circuit of said configured PLD to:
(1) determine whether said network data stream includes the string matching said second regular expression pattern, and
(2) perform said second responsive action if said network data stream includes the string matching said second regular expression pattern;
maintaining full throughput of network data through the PLD while the first logic circuit processes the stream of network data and the second logic circuit processes the stream of network data.

2. The method of claim 1 wherein said configuring step includes:
receiving said first and second regular expression patterns;
receiving a first action command specifying the first responsive action to be performed if said network data stream includes the string matching said first regular expression pattern;
receiving a second action command specifying the second responsive action to be performed if said network data stream includes the string matching said second regular expression pattern;
generating configuration information from said received first and second regular expression patterns and said first and second received action commands, said configuration information defining a module that is operable upon being configured into said PLD to:
(1) determine whether a stream of network data applied thereto includes the string matching said first regular expression pattern,
(2) perform said first responsive action if said network data stream includes the string matching said first regular expression pattern,
(3) determine whether the stream of network data applied thereto includes the string matching said received second regular expression pattern, and
(4) perform said second responsive action if said network data stream includes the string matching said second regular expression pattern; and
configuring said PLD with said configuration information.

3. The method of claim 2 wherein at least one of said action commands of said first and second action command receiving steps specifies a data modification operation identifying how the network data stream is to be modified if the network data stream includes the corresponding matching string.

4. The method of claim 3 wherein at least one of said action commands of said first and second action command receiving steps specifies a string replacement operation identifying a replacement string to be inserted into the network data stream in place of the corresponding matching string.

5. The method of claim 2 wherein at least one of said action commands of said first and second action command receiving steps specifies a notification operation identifying a notification signal to be transmitted if the network data stream includes the corresponding matching string.

6. The method of claim 2 wherein said network data stream is a stream of packets transmitted over a computer network, each data packet including a payload portion, and said processing steps include:
receiving a stream of network data packets;
identifying the payload portion of each received data packet; and
processing the payload portion of each received data packet through said configured PLD to:
(1) determine whether the payload portion includes the string matching said first regular expression pattern,
(2) perform said first responsive action if said a payload portion includes the string matching said first regular expression pattern,
(3) determine whether the payload portion of includes the string matching said second regular expression pattern, and
(4) perform said second responsive action if said payload portion includes the string matching said second regular expression pattern.

7. The method of claim 6 wherein said step of configuring said PLD with said configuration information includes transmitting said configuration information over said computer network to said PLD.

8. A device for generating configuration information operable to configure a programmable logic device (PLD) with a data processing module operable to receive and process a stream of network data through said PLD to determine whether said network data stream includes a regular expression pattern while maintaining full throughput of network data through the PLD and, if so, perform a responsive action, said device comprising:
an input operable to receive a plurality of regular expression patterns and a plurality of action commands from a user, each of said plurality of action commands specifying an action to be performed if said network data stream includes a string matching a corresponding regular expression pattern of said plurality of regular expression patterns;
a compiler operable to generate configuration information from said regular expression patterns and said action commands, said configuration information defining a plurality of data processing modules, each of said modules being operable upon being configured into said PLD to:

(1) determine whether a stream of network data applied thereto includes a string matching at least one of said plurality of regular expression patterns, and (2) perform said corresponding action if said network data stream includes the matching string, said configuration information being operable to configure said PLD with said data processing modules.

9. The device of claim 8 wherein each of said action commands comprises a modification command specifying a modification operation to be performed on said network data stream if said network data stream includes the matching string, and said compiler is operable to generate said configuration information from said modification command such that said module defined thereby is operable upon being configured into said PLD to perform said modification operation on said network data stream if said network data stream includes the matching string.

10. The device of claim 9 wherein said compiler is operable to process each of said regular expression patterns through a lexical analyzer generator thereby to generate a logical representation of a pattern matching state machine that is operable to determine whether a stream of network data applied thereto includes a string that matches said received regular expression pattern, said pattern matching state machine representation at least in part defining said module.

11. The device of claim 10 wherein said modification operation specified by said modification command comprises a string replacement operation, said modification command includes a replacement string, and said compiler is also operable to process said received modification command thereby to generate a logical representation of a string replacement machine that is operable to replace the matching string in said network data stream with said replacement string, said string replacement machine representation at least in part defining said module.

12. The device of claim 11 wherein said compiler is operable to process said regular expression patterns through said lexical analyzer generator such that said pattern matching state machine representation comprises at least one deterministic finite automaton (DFA).

13. The device of claim 12 wherein said network data stream is a packet stream comprising a plurality of data packets transmitted over a computer network, and said device further comprises a transmitter interfacing said compiler with said computer network, said transmitter being operable to receive said configuration information from said compiler and transmit said configuration information over said network to a configuring device in communication with said PLD, said configuring device being operable to configure said PLD with said module defined thereby.

14. The device of claim 13 wherein each packet in said packet stream includes a payload portion, and wherein said compiler is further operable to generate said configuration information such that said module defined thereby is also operable upon being configured into said PLD to determine whether at least one of said payload portions of said packets includes a string matching at least one of said regular expression patterns.

15. The device of claim 8 further comprising a protocol wrapper operative to receive network data from a computer network and process said network data to generate said network data stream therefrom.

16. A method of configuring a programmable logic device (PLD) to process a stream of network data, said method comprising:

receiving a plurality of regular expression patterns;

receiving a plurality of action commands, each of said action commands corresponding to at least one of said plurality of regular expression patterns and specifying an action to be performed if said stream of includes a string matching at least one of said plurality of regular expression patterns;

generating configuration information from said received plurality of regular expression patterns and said received plurality of action commands that is operable to configure said PLD with a data processing module that is operable upon being configured into said PLD to:

(1) determine whether a network data stream applied thereto includes a string matching at least one of said plurality of regular expression patterns, (2) perform said action specified by said corresponding action command if said network data stream includes the matching string, and (3) maintain full throughput of network data through the PLD; and communicating said configuration information to a configuring device in communication with said PLD, said configuring device being operable to configure said PLD with said configuration information.

17. The method of claim 16 wherein each of said plurality of action commands comprises a modification command specifying a modification operation to performed on said network data stream if said network data stream includes the matching string, and said generating step includes generating said configuration information such that said module defined thereby is operable to perform said modification operation on said network data stream if said network data stream includes the matching string.

18. The method of claim 17 wherein said modification operation comprises a string replacement operation, said modification command includes a replacement string, and said generating step includes generating said configuration information such that said module defined thereby is operable to perform said string replacement operation by replacing the matching string in said network data stream with said replacement string.

19. The method of claim 18 wherein said generating step includes processing each of said plurality of regular expression patterns through a lexical analyzer generator to create a logical representation of a pattern matching state machine therefrom, said pattern matching state machine at least in part defining said module and being operable to determine whether a stream of network data applied thereto includes the matching string.

20. The method of claim 19 wherein said generating step includes creating a logical representation of a string replacement machine from each of said received modification commands, said string replacement machine at least in part defining said module and being operable to replace the matching string in said network data stream with said replacement string.

21. The method of claim 20 wherein said network data stream is a packet stream comprising a plurality of data packets transmitted over a computer network, and said communicating step includes communicating said configuration information over said network to said configuring device.

22. The method of claim 21 wherein each of said data packets includes a payload portion, and wherein said generating step includes generating said configuration information such that said module defined thereby is also operable upon being configured into said PLD to determine whether any of said payload portions of said packets comprising said packet stream include the matching string.

23. A device for processing a stream of network data, said device comprising a programmable logic device (PLD) configured to receive a stream of network data and process said network data stream through a plurality of redefinable logic circuits, each logic circuit being configured to recognize a corresponding redefinable regular expression pattern, determine whether a string is present in said processed network data stream matching the corresponding regular expression pattern in the logic circuit, store a corresponding redefinable action, and perform the corresponding redefinable action if said processed network data stream includes the string matching the corresponding regular expression pattern in the logic circuit, said PLD maintaining full throughput of said network data while said logic circuits determine whether the string is present and perform the corresponding redefinable action.

24. The device of claim 23 wherein each redefinable action comprises a string replacement operation, each string replacement operation including a replacement string, wherein each logic circuit is operable to replace the matching string with the corresponding replacement string.

25. The device of claim 24 wherein said PLD comprises a field programmable gate array (FPGA) in communication with a computer network, and said network data stream comprises a stream of data packets transmitted over said computer network.

26. The device of claim 23 wherein at least one of said logic circuits comprises a deterministic finite automaton (DFA).

27. A reprogrammable system for processing a stream of network data, said system comprising:
    a reprogrammable data processor for receiving a stream of network data and processing said received network data stream through a programmable logic device (PLD) configured with at least one deterministic finite automaton (DFA) to determine whether said network data stream includes a string matching a first regular expression pattern while maintaining full throughput of said network data; and
    a reconfiguration device in communication with said data processor that is operable to reconfigure said PLD with a different DFA to determine whether said network data stream includes a string matching a second regular expression pattern.

28. The device of claim 27 wherein the processor is operable to store a redefinable action command specifying an action to be performed if said network data stream includes a string matching said first regular expression pattern and perform the action if said network data stream includes the string matching said first regular expression pattern.

29. A network processor for processing a stream of data packets transmitted over a computer network while maintaining full throughput of said network data, said network processor comprising:
    a protocol wrapper operative to receive data from said computer network and process said data to generate a stream of data packets therefrom, said packet stream comprising a stream of words, each word including a plurality of bytes;
    a matching path operative to receive said packet stream from said protocol wrapper and detect whether said packets include a string matching a regular expression pattern;
    a controller in communication with said matching path that is operative to determine a starting byte position and an ending byte position of each matching string detected by said matching path; and
    a data path in communication with said controller that is operative to receive said packet stream from said protocol wrapper and process each starting byte position and ending byte position of each matching string determined by said controller to:
        (1) output each byte of said packet stream that does not correspond to the matching string, and
        (2) replace the bytes of said packet stream that correspond to the matching string with a replacement string;
    wherein said matching path, said controller, and said data path are implemented on a programmable logic device (PLD) capable of maintaining full throughput of said network data.

30. The network processor of claim 29 wherein said protocol wrapper is implemented on said PLD.

* * * * *